United States Patent
Kusama et al.

(10) Patent No.: US 9,614,200 B2
(45) Date of Patent: Apr. 4, 2017

(54) HERMETICALLY SEALED BATTERY

(75) Inventors: Kazuyuki Kusama, Nagoya (JP); Tomohiro Matsuura, Toyota (JP); Takashi Harayama, Toyota (JP); Yasushi Hirakawa, Moriguchi (JP); Ichiro Murata, Settsu (JP); Shinya Muroi, Kawagoe (JP)

(73) Assignees: Toyota Jidosha Kabushiki Kaisha, Toyota-shi, Aichi (JP); Kokoku Intech Co., Ltd., Taito-ku, Tokyo (JP)

( * ) Notice: Subject to any disclaimer, the term of this patent is extended or adjusted under 35 U.S.C. 154(b) by 85 days.

(21) Appl. No.: 14/119,743

(22) PCT Filed: Apr. 17, 2012

(86) PCT No.: PCT/JP2012/060331
§ 371 (c)(1),
(2), (4) Date: Jul. 10, 2014

(87) PCT Pub. No.: WO2012/160907
PCT Pub. Date: Nov. 29, 2012

(65) Prior Publication Data
US 2014/0322565 A1 Oct. 30, 2014

(30) Foreign Application Priority Data

May 25, 2011 (JP) ................. 2011-117343

(51) Int. Cl.
*H01M 2/08* (2006.01)
*H01M 2/36* (2006.01)
(Continued)

(52) U.S. Cl.
CPC ............. *H01M 2/08* (2013.01); *H01M 2/365* (2013.01); *H01M 2/04* (2013.01); *H01M 2/06* (2013.01);
(Continued)

(58) Field of Classification Search
CPC ....................... H01M 10/0525; H01M 2220/20
See application file for complete search history.

(56) References Cited

U.S. PATENT DOCUMENTS 6,455,193 B1 9/2002 Miyazaki et al.
2007/0096688 A1* 5/2007 Suzuki et al. ................. 320/112

FOREIGN PATENT DOCUMENTS

| CN | 202042559 | 11/2011 |
|---|---|---|
| JP | 2000-268811 | 9/2000 |

(Continued)

*Primary Examiner* — Jane Rhee
(74) *Attorney, Agent, or Firm* — Finnegan, Henderson, Farabow, Garrett & Dunner, LLP

(57) ABSTRACT

A hermetically sealed battery is provided with a sealing member for air-tightly sealing the through-hole of a battery case from the outside. The sealing member has: a covering member secured to the battery case from the outside; an insertion portion inserted into the through-hole; an annular pressure contact portion in air-tight pressure contact with the hole surrounding portion of the battery case; and a connecting portion disposed between the insertion portion and the annular pressure contact portion so as to be integral with the insertion portion and the annular pressure contact portion. The connecting portion is provided with an annular groove surrounding the insertion portion.

6 Claims, 25 Drawing Sheets

(51) Int. Cl.
  *H01M 2/12* (2006.01)
  *H01M 10/0525* (2010.01)
  *H01M 2/04* (2006.01)
  *H01M 2/06* (2006.01)
  *H01M 2/30* (2006.01)

(52) U.S. Cl.
  CPC ............ *H01M 2/1241* (2013.01); *H01M 2/30* (2013.01); *H01M 10/0525* (2013.01); *H01M 2220/20* (2013.01); *Y02T 10/7011* (2013.01)

(56) References Cited

FOREIGN PATENT DOCUMENTS

| | | |
|---|---|---|
| JP | 2001-313022 | 11/2001 |
| JP | 2004-119329 | 4/2004 |
| JP | 2007-18915 | 1/2007 |
| JP | 2009-87659 | 4/2009 |
| JP | 2012-248336 | 12/2012 |

* cited by examiner

HERMETICALLY SEALED BATTERY

CROSS-REFERENCE TO RELATED APPLICATIONS

This is a US national phase application based on the PCT International Patent Application No. PCT/JP2012/060331, filed Apr. 17, 2012, and claiming the priority of Japanese Patent Application No. 2011-117343, filed May 25, 2011, whose entire disclosures are herewith incorporated by reference.

TECHNICAL FIELD

The present invention relates to a hermetically sealed battery including a battery case having a through hole for communicating the inside with the outside of the case itself, an electrode body accommodated in this battery case, and a sealing member that hermetically seals the through hole of the battery case from the outside.

BACKGROUND ART

Heretofore, there is known a hermetically sealed battery (a "sealed battery") including a battery case formed with a through hole such as a liquid inlet used for injection of an electrolyte, an electrode body accommodated in this battery case, and a sealing member that hermetically seals the through hole of the battery case from the outside. One example of the sealing member is formed of a metallic lid member. This sealing member (a metallic lid member) 915 is welded, at its circumferential edge portion 915m, over the whole circumference to an annular surrounding portion 913m surrounding a liquid inlet (a through hole) 913e of a battery case 913 as shown in FIG. 23, thereby hermetically sealing the liquid inlet 913e from outside (from above in FIG. 23).

Regarding this sealing member 915, however, when the circumferential edge portion 915m of the sealing member 915 is welded to the surrounding portion 913m of the battery case 913, the electrolyte stuck to the surrounding portion 913m and the electrolyte evaporated by heat during welding may cause sealing failures (welding failures). Thus, it is difficult to reliably hermetically seal the liquid inlet 913e by welding of the whole circumference of the sealing member 915.

Another sealed battery uses, as shown in FIG. 24, a sealing member 925 including the aforementioned metallic lid member 915 joined with a circular disk-like elastic member 926 made of rubber. This sealing member 925 is configured so that the elastic member (an elastic part) 926 is fitted in a recessed portion 923h provided around a liquid inlet 923e of a battery case 923 to close the liquid inlet 923e from outside (from above in FIG. 24). While the elastic part 926 is compressed between the metallic lid member (a metallic lid part) 915 and the battery case 923, the circumferential edge portion 915m of the metallic lid part 915 is welded to the surrounding portion 923m of the battery case 923 so that the liquid inlet 923e is hermetically sealed by the elastic part 926. A sealed battery similar to this is disclosed in Patent Document 1 (see FIG. 5 and others of Patent Document 1).

This sealing member 925 is designed so that the size of the elastic part 926 in a radial direction (the size in a right-and-left direction in FIG. 24) is equal to the radial size of the recessed portion 923h so that the elastic part 926 is tightly fitted in the recessed portion 923h. Accordingly, even when the elastic part 926 is compressed between the metallic lid part 915 and the battery case 923, the elastic part 926 is not allowed to expand radially outward and thus the elastic part 926 is further applied with force from radially outside (from a side surface of the recessed portion 923h). In the elastic part 926, therefore, stress is generated in not only the thickness direction but also the radial direction. In this state, it is difficult for the elastic part 926 to keep hermeticity of the battery case 923 for a long period. In particular, since a sealed battery for use in a vehicle such as a hybrid car and an electric car is used for a long period, e.g., over 10 years, the hermeticity of the battery case 923 is demanded.

On the other hand, to solve the above problems, it is conceivable to set the radial size of the elastic part 926 to be smaller than the size of the recessed portion 923h to provide a clearance between the elastic part 926 and the recessed portion 923h in the radial direction. However, this configuration causes a new problem that it is difficult to accurately position the elastic part 926 in the recessed portion 923h.

Furthermore, another sealing member 935 has been proposed in which, as shown in FIG. 25, an insertion portion 936 press-fitted in the liquid inlet 923e and an annular pressure-contact portion 937 formed integrally continuous to and around this insertion portion 936 are joined to the metallic lid part 915. This sealing member 935 utilizes the insertion portion 936 as a positioning guide and thus can accurately position the sealing member 935 with respect to the liquid inlet 923e. A sealed battery similar to this is disclosed in Patent Document 2 (see FIG. 2 and others of Patent Document 2).

RELATED ART DOCUMENTS

Patent Documents

Patent Document 1: JP-A-2004-119329
Patent Document 2: JP-A-2000-268811

SUMMARY OF INVENTION

Problems to be Solved by the Invention

However, the insertion portion 936 is compressed radially inward when it is press-fitted in the liquid inlet 923e, and hence the annular pressure-contact portion 937 integrally continuous to the insertion portion 936 is also pulled radially inward. This generates stress in the annular pressure-contact portion 937 not only in the thickness direction but also in the radial direction. In this case, therefore, it is difficult for the annular pressure-contact portion 937 to keep the hermeticity of the battery case 923 for a long time.

Even if the radial size (the size in the right-and-left in FIG. 25) of the insertion portion 936 is reduced to provide a clearance between the insertion portion 936 and the liquid inlet 923e without press-fitting the insertion portion 936 in the liquid inlet 923e (loose fit), a part of the insertion portion 936 in the circumferential direction may contact with the liquid inlet 923e (one-side contact) when the insertion portion 936 is inserted in the liquid inlet 923e. In this contact portion, the insertion portion 936 is compressed radially inward, thus pulling the annular pressure-contact portion 937 radially inward. In this case, similarly, the annular pressure-contact portion 937 cannot keep the hermeticity of the battery case 923 for a long period. As above, conventional sealed batteries cannot keep long-term hermeticity in the through hole such as the liquid inlet sealed by the sealing member.

The present invention has been made in view of the above circumstances and has a purpose to provide a hermetically sealed battery capable of keeping long-term hermeticity in a through hole formed in a battery case sealed by a sealing member (i.e., of providing a high long-term reliable hermeticity).

Means of Solving the Problems

To achieve the above purpose, one aspect of the invention provides a hermetically sealed battery including: a battery case having a through hole that communicates inside with outside of the battery case; an electrode body accommodated in the battery case; and a sealing member that hermetically seals the through hole from outside, wherein the sealing member includes: a covering part fixed to the battery case to cover the through hole from outside; an insertion part made of a rubber-like elastic body protruding from an inner surface of the covering part, the inner surface being located facing the battery case, and the insertion part being inserted in the through hole; and an annular pressure-contact portion made of a rubber-like elastic body protruding from the inner surface of the covering part to surround the insertion portion and being hermetically pressure-contact with an annular hole-surrounding portion of the battery case located around the through hole under pressure by the covering part, wherein the sealing member is formed in one of: a configuration that the insertion portion and the annular pressure-contact portion are spaced from each other; a configuration that the sealing member includes a connecting portion made of a rubber-like elastic body protruding in annular form from the inner surface of the covering part and being located between and integral with the insertion portion and the annular pressure-contact portion, the connecting portion being formed with an annular groove extending around the insertion portion; and a configuration that the insertion portion and the annular pressure-contact portion are directly continuous to each other in one piece, a base portion of the insertion portion, the base portion being located closer to the covering part than a contact portion contactable with the through hole is formed with a groove constricted in a radial direction of the base portion.

This sealed battery can keep long-term hermeticity of the through hole formed in the battery case sealed by the sealing member.

In the above sealed battery, furthermore, it is preferable that the insertion portion is press-fitted in the through hole to hermetically seal the through hole.

In the above sealed battery, furthermore, it is preferable that the inside of the battery case is depressurized below atmospheric pressure.

In any one of the above sealed batteries, furthermore, it is preferable that the covering part includes a circumferential edge portion welded to the battery case by a plurality of spot welds spaced apart from each other.

In any one of the above sealed batteries, furthermore, it is preferable that outside of the annular pressure-contact portion is communicated with outside of the battery case, and the annular pressure-contact portion includes a recess partially formed in a circumferential direction to reduce a sealing performance of the annular pressure-contact portion than that of other portions in the circumferential direction.

In any one of the above sealed batteries, furthermore, it is preferable that the battery case includes a safety valve in a position close to the through hole and the sealing member.

MODE FOR CARRYING OUT THE INVENTION (First Embodiment)

Figure 1:
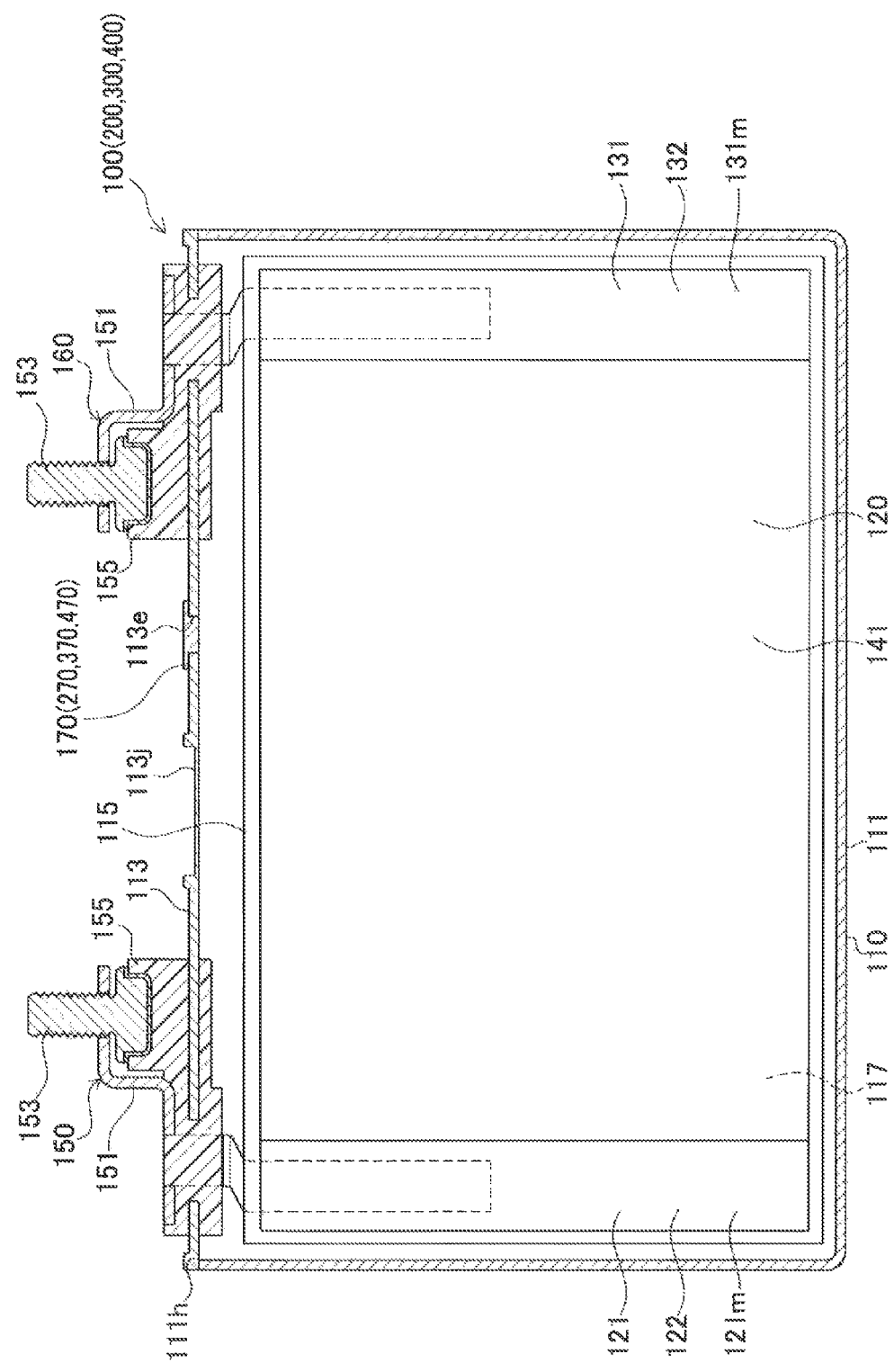
FIG. 1 is a longitudinal cross sectional view showing a lithium ion secondary battery in a first embodiment.
Figure 2:
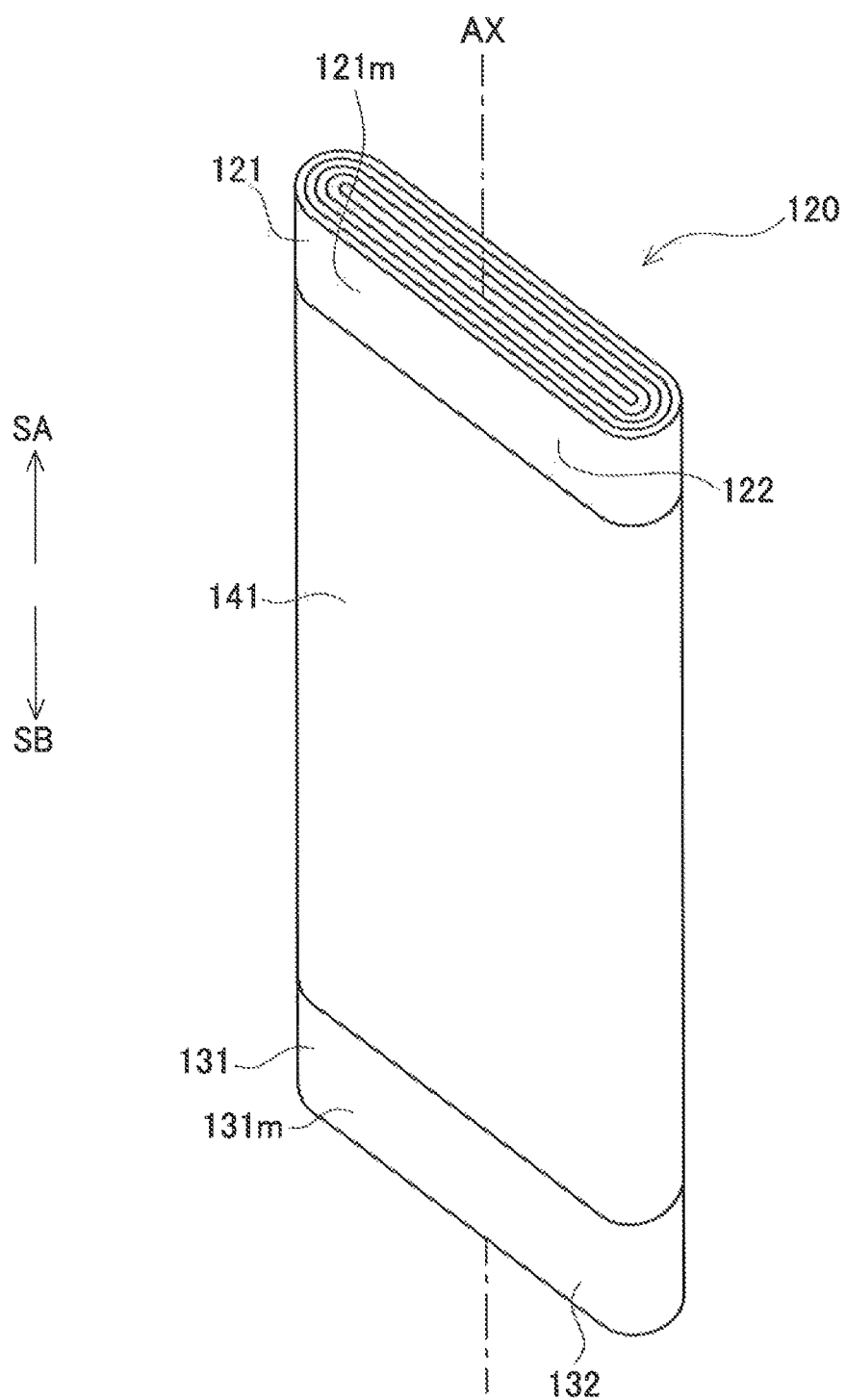
FIG. 2 is a perspective view of an electrode body in the first embodiment.
Figure 3:
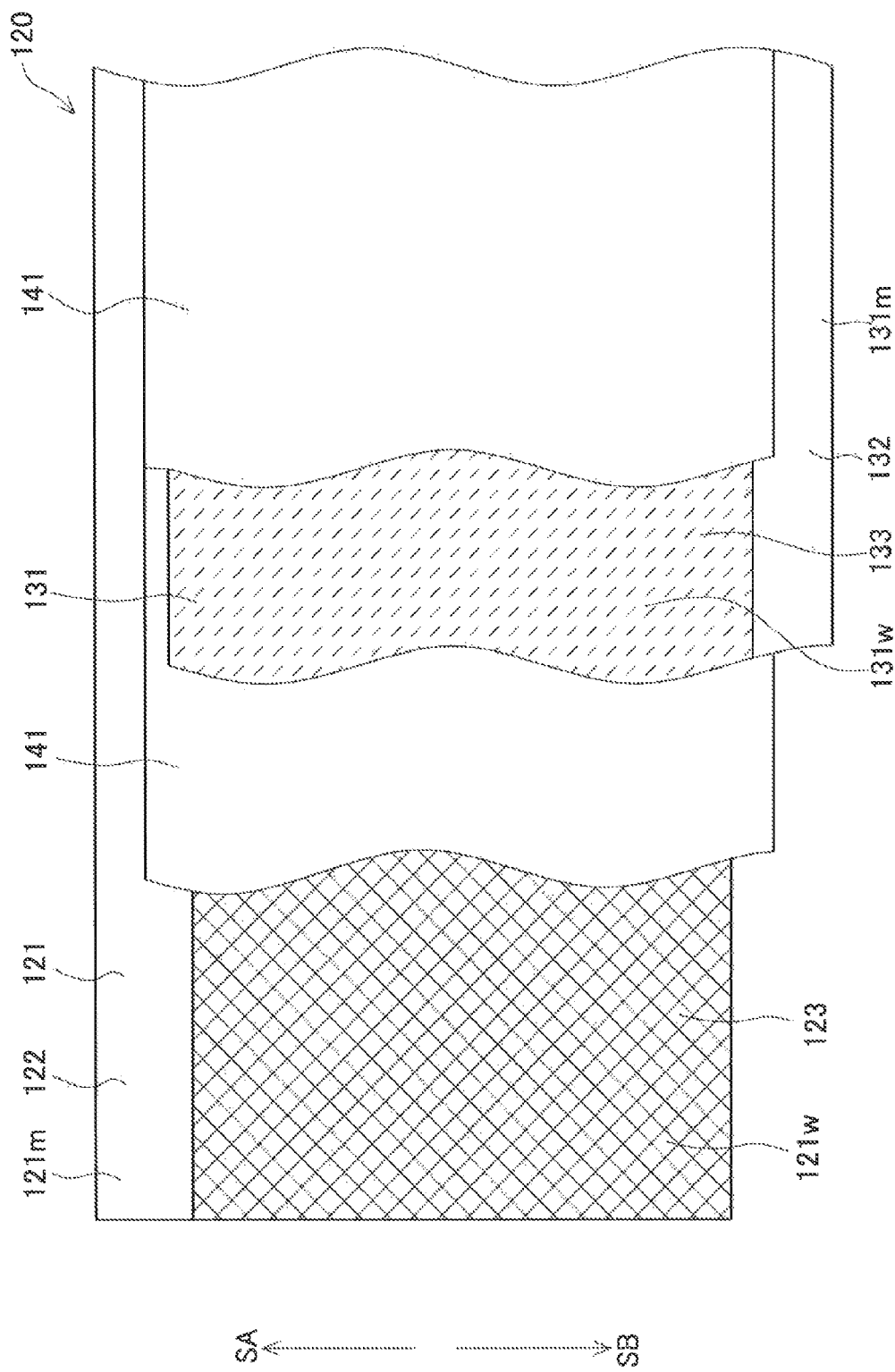
FIG. 3 is a partial plan view showing a state in which a positive electrode sheet and a negative electrode sheet are laminated by interposing separators in the first embodiment.
Figure 4:
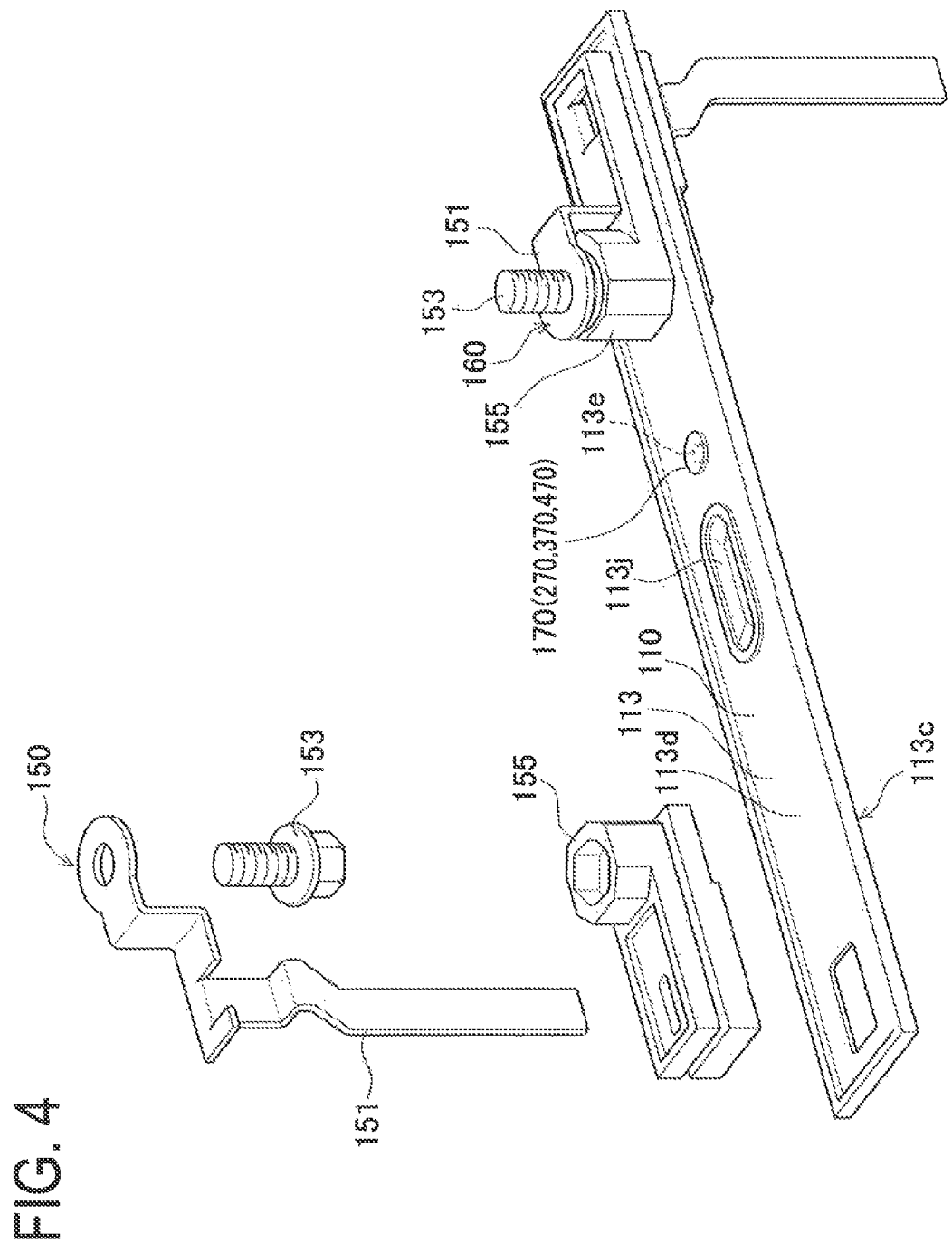
FIG. 4 is an exploded perspective view showing a case lid member, a positive terminal, a negative terminal, and others in the first embodiment.
Figure 5:
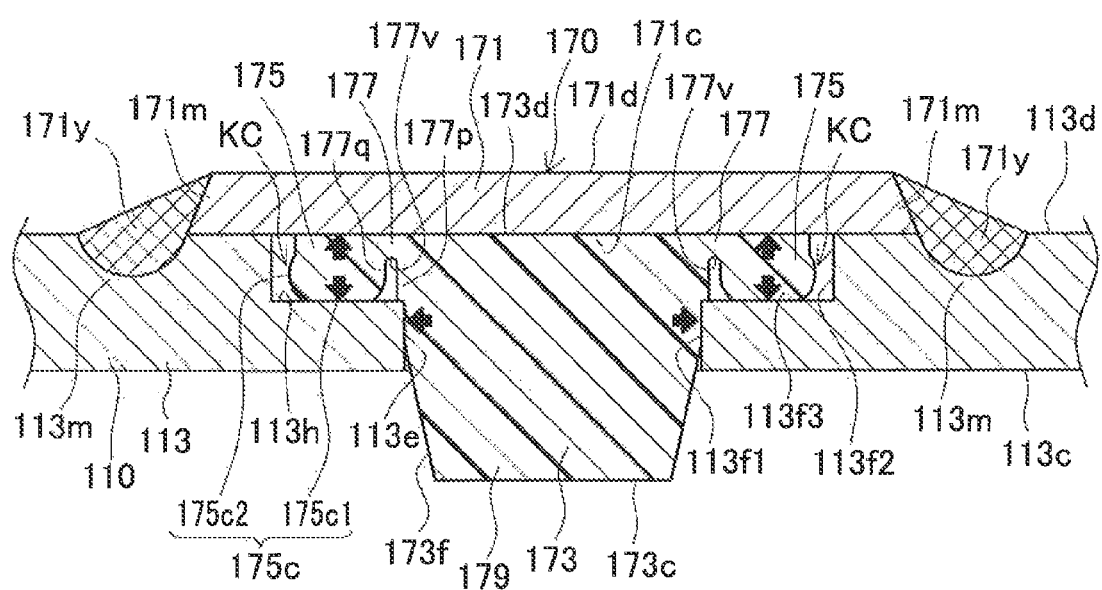
FIG. 5 is a partial enlarged longitudinal cross sectional view showing a liquid inlet, a sealing member, and its surroundings in the first embodiment.
Figure 6:
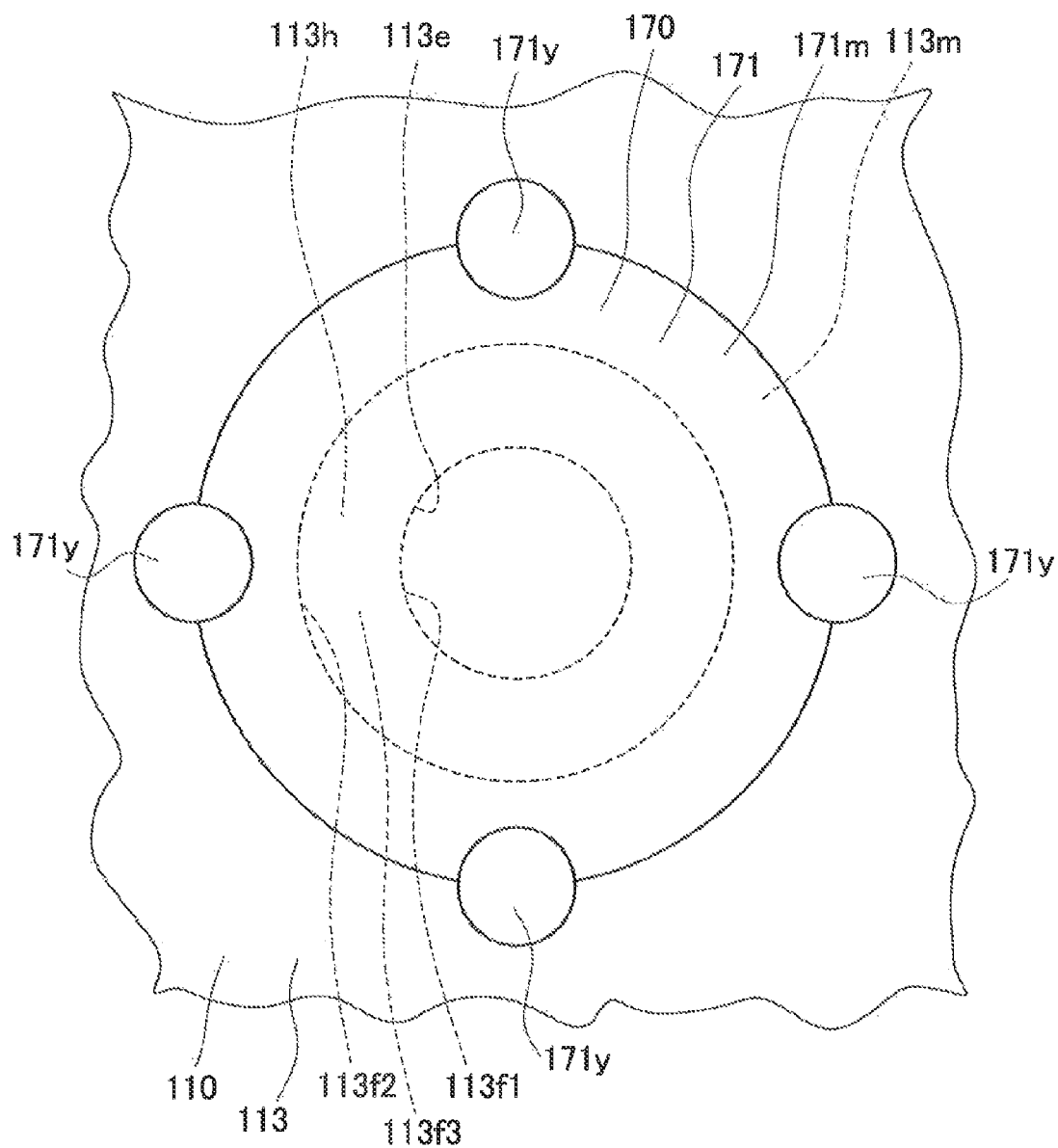
FIG. 6 is a partial enlarged plan view showing the sealing member and its surroundings seen from above in FIG. 5 in the first embodiment.

A detailed description of an embodiment of the present invention will now be given referring to the accompanying drawings. FIG. 1 illustrates a lithium ion secondary battery (a hermetically sealed battery) 100 (hereinafter, also simply referred to as a battery 100) in a first embodiment. FIGS. 2 and 3 show a wound-type electrode body 120 of the battery 100 and its exploded state. FIG. 4 shows a case lid member 113, a positive electrode terminal 150, a negative electrode terminal 160, and others in detail. FIGS. 5 and 6 show the configuration of a liquid inlet (a through hole) 113e and a sealing member 170 and their vicinity. It is to be noted that the following explanation is made by assuming an upper side in FIGs. 1, 4, and 5 as an upper side of the battery 100 and a lower side in those figures as a lower side of the battery 100.

This battery 100 is a rectangular battery to be mounted in a vehicle such as a hybrid vehicle and an electric vehicle or a battery-using device such as a hammer drill. This battery 100 includes a rectangular parallelepiped battery case 110, a wound-type electrode body 120 accommodated in this battery case 110, a positive electrode terminal 150 and a negative electrode terminal 160 supported by the battery case 110, and others (see FIG. 1). The battery case 110 contains a non-aqueous electrolyte 117.

The battery case 110 is made of metal (aluminum in the first embodiment). This battery case 110 consists of a box-shaped case body member 111 opening only at an upper side and a case lid member 113 welded to close an opening 111h of the case body member 111 (see FIGS. 1 and 4). The case lid member 113 is formed in a rectangular plate-like shape having an inner main surface 113c facing to the inside of the battery case 110 and an outer main surface 113d facing to the outside of the battery case 110.

The case lid member 113 is provided with a safety valve 113j which will be broken when the inner pressure of the battery case 110 reaches a predetermined pressure. This case lid member 113 is provided with a liquid inlet (a through hole) 113e which will be described later to communicate the inside with the outside of the battery case 110. This liquid inlet 113e is hermetically closed by a sealing member 170 which will be described later while the inside of the battery case 110 is depressurized below atmospheric pressure.

To the case lid member 113, the positive electrode terminal 150 and the negative electrode terminal 160, each of which consists of an extending terminal member 151 and a bolt 153, are fixed through corresponding insulation members 155 made of resin (see FIGS. 1 and 4). In the battery case 110, the positive electrode terminal 150 is connected to a positive electrode sheet 121 (its positive current collecting part 121m) of the electrode body 120, while the negative electrode terminal 160 is connected to a negative electrode sheet 131 (its negative current collecting part 131m) of the electrode body 120 (see FIG. 1).

The electrode body 120 will be explained below. This electrode body 120 is enclosed in an insulation film envelope 115 formed of an insulation film in a sacklike shape opening only in the upper side, and further accommodated in a sideways position in the battery case 110 (see FIG. 1). This electrode body 120 is configured so that the strip-shaped positive electrode sheet 121 and the strip-shaped negative electrode sheet 131 are laminated one on top of the other by interposing the strip-shaped separators 141 therebetween (see FIG. 3) and wound around an axis line AX and compressed into a flattened shape (see FIG. 2).

The positive electrode sheet 121 includes, as a core member, a positive current collecting foil 122 made of a strip-shaped aluminum foil. Of both main surfaces of this positive current collecting foil 122, regions which are part in a width direction and extending a longitudinal direction (in a right-and-left direction in FIG. 3) are provided with strip-shaped positive active material layers 123, 123 in the longitudinal direction. Those positive active material layers 123, 123 are each formed of a positive active material, a conductive material, and a binding material.

A strip-shaped portion of the positive electrode sheet 121, in which the positive current collecting foil 122 and the positive active material layers 123, 123 are present in the thickness direction of the positive electrode sheet 121 is referred to as a positive electrode part 121w. In a finished state of the electrode body 120, the whole region of this positive electrode part 121w faces a negative electrode part 131w mentioned later of the negative electrode sheet 131 through the separators 141 (see FIG. 3). In association with the presence of the positive electrode part 121w of the positive electrode sheet 121, an end portion of the positive current collecting foil 122 on one side (upper side in FIG. 3) in a width direction forms a positive current collecting part 121m that extends in a strip shape in the longitudinal direction and that is not provided with the positive active material layers 123 in the thickness direction. A part of this positive current collecting part 121m in the width direction protrudes from the separators 141 in a spiral form on one side SA along the axis line AX and is connected to the above positive electrode terminal 150 (see FIG. 1).

The negative electrode sheet 131 includes, as a core member, a strip-shaped negative current collecting foil 132 made of a copper foil core. Of both main surfaces of this negative current collecting foil 132, regions which are part in a width direction and extending a longitudinal direction are provided with strip-shaped negative active material layers 133, 133 in the longitudinal direction (in the right-and-left direction in FIG. 3). Those negative active material layers 133, 133 are each formed of negative active material, binding material, and thickening agent.

A strip-shaped portion of the negative electrode sheet 131, in which the negative current collecting foil 132 and the negative active material layers 133, 133 are present in the thickness direction of the negative electrode sheet 131 is referred to as a negative electrode part 131w. In the finished state of the electrode body 120, the whole region of this negative electrode part 131w faces the separators 141. In association with the presence of the negative electrode part 131w of the negative electrode sheet 131, an end portion of the negative current collecting foil 132 on one side (lower side in FIG. 3) in the width direction forms a negative current collecting part 131m that extends in a strip shape in the longitudinal direction and that is not provided with the negative active material layers 133 in the thickness direction. A part of this negative current collecting part 131m in the width direction protrudes from the separators 141 in a spiral form on the other side SB along the axis line AX and is connected to the above negative electrode terminal 160 (see FIG. 1).

Furthermore, each separator 141 is a porous film in a strip shape, made of resin, concretely, polypropylene (PP) and polyethylene (PE).

The following explanation is given to the liquid inlet 113e, the recessed portion 113h, and the sealing member 170 (see FIGS. 5-9). The liquid inlet 113e, recessed portion 113h, and sealing member 170 are placed in the vicinity of the safety valve 113j (see FIG. 4). To be concrete, the case lid member 113 is provided with the liquid inlet 113e, the recessed portion 113h, and the safety valve 113j and further fixedly attached with the positive electrode terminal 150 and the negative electrode terminal 160. The liquid inlet 113e and the sealing member 170 closing this liquid inlet 113e are located in a position apart from the safety valve 113j at a shorter distance than the distance from the liquid inlet 113e and the sealing member 170 to the positive electrode terminal 150 or negative electrode terminal 160.

Figure 8:
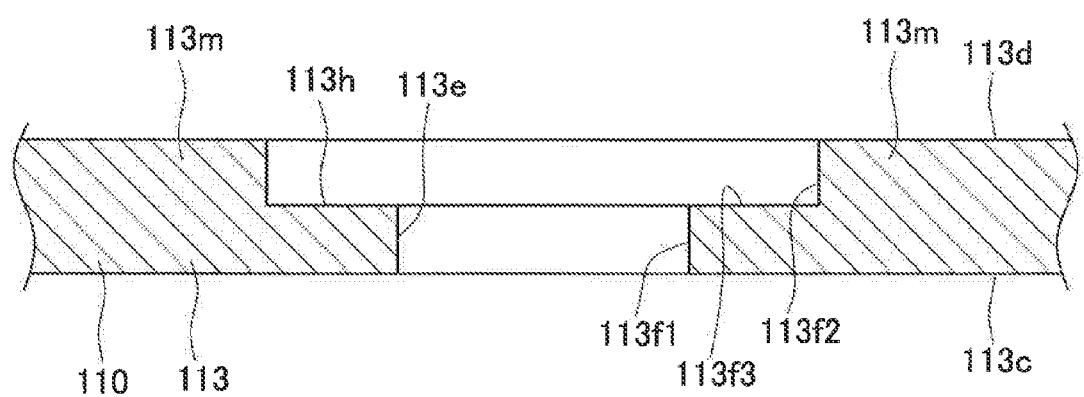
FIG. 8 is a partial enlarged longitudinal cross sectional view of the case lid member, showing the liquid inlet and its surroundings in the first embodiment.
Figure 9:
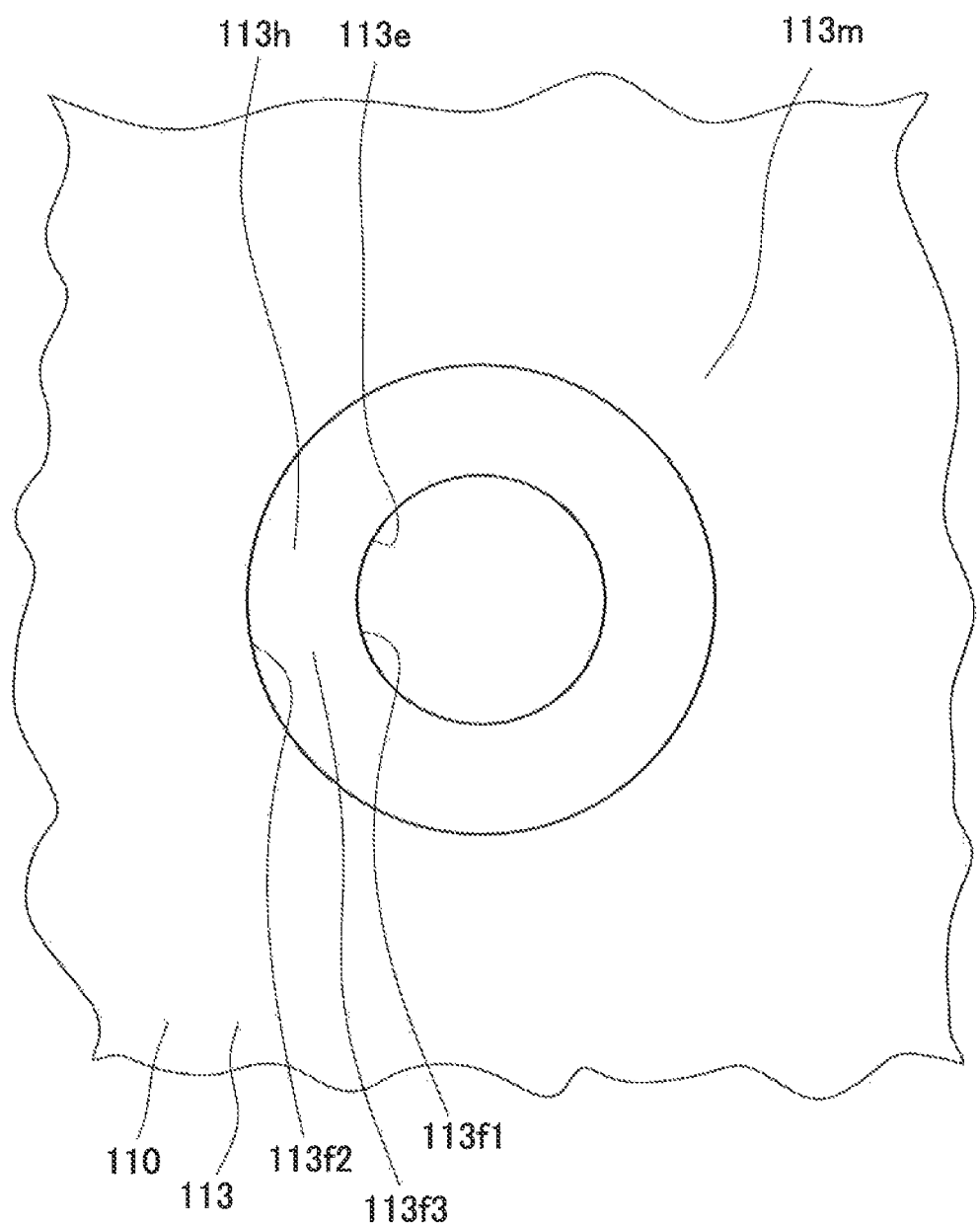
FIG. 9 is a partial enlarged plan view of the case lid member, showing the liquid inlet and its surroundings, seen from above in FIG. 8 in the first embodiment.

The recessed portion 113h (see FIGS. 8 and 9, and others) is a recessed portion in a circular shape in plan view, that is recessed toward the inner main surface 113c of the case lid member 113 (the lower side in FIG. 8) and opens in the outer main surface 113d (the upper side in FIG. 8). This recessed portion 113h is defined by a recessed-portion side surface 113f2 having a cylindrical shape and a recessed-portion bottom surface 11313 which is a flat surface extending in parallel to the inner main surface 113c and the outer main surface 113d. In the first embodiment, the recessed-portion bottom surface 11313 corresponds to an annular "hole-surrounding portion" located around the liquid inlet 113e.

The liquid inlet 113e (see FIGS. 8 and 9) is a circular hole provided at the center of the recessed-portion bottom surface 11313 to communicate the inner main surface 113c with the bottom surface 11313 to allow injection of the electrolyte 117 into the battery case 110. This liquid inlet 113e communicates the inside with the outside of the battery case 110. This liquid inlet 113e is defined by a hole side surface 113f1 having a cylindrical shape.

Figure 7:
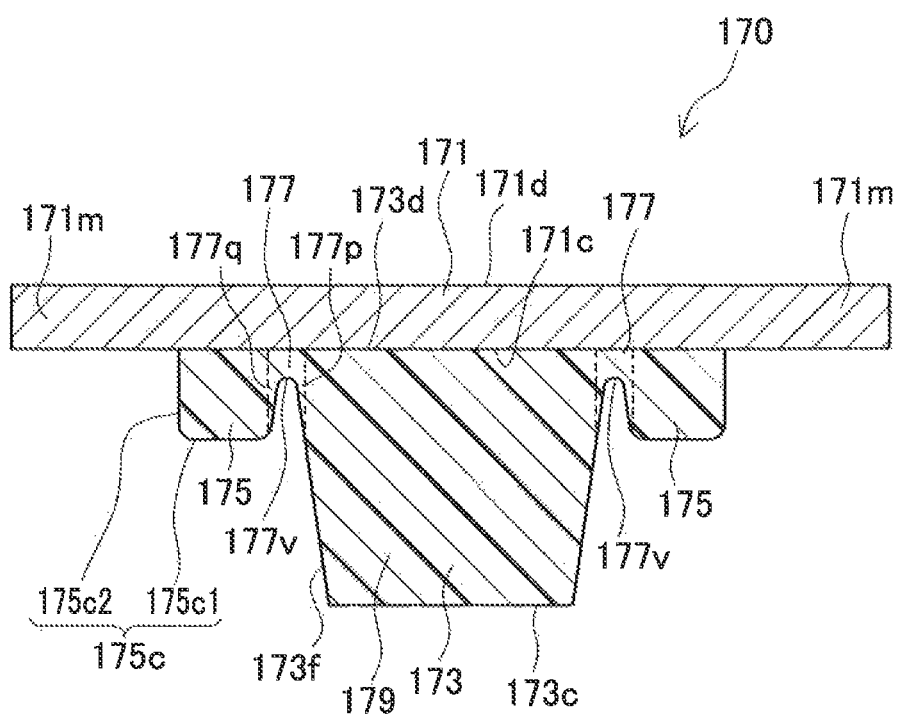
FIG. 7 is a longitudinal cross sectional view showing the sealing member in the first embodiment.

On the other hand, the sealing member 170 (see FIG. 7) includes a covering member (a covering part) 171 and an elastic member 179. This elastic member 179 consists of an insertion portion 173, an annular pressure-contact portion 175, and a connecting portion 177. In FIG. 7, the boundary between the insertion portion 173 and the connecting portion 177 and the boundary between the connecting portion 177 and the annular pressure-contact portion 175 are indicated with broken lines.

The covering member 171 is made of the same material as that of the battery case 110, concretely, aluminum. This covering member 171 includes an inner surface 171c which is a main surface located facing the battery case 110 (the case lid member 113) (the lower side in FIGS. 5 and 7) and an outer surface 171d which is a main surface located in parallel to the inner surface 171c and on the opposite side (the upper side in FIGS. 5 and 7) to the case lid member 113. The covering member 171 has a circular plate-like shape having a larger diameter than the recessed portion 113h.

This covering member 171 is fixed to the battery case 110 so as to cover the liquid inlet 113e from the outside of the battery case 10 (see FIGS. 5 and 6). To be concrete, an annular circumferential edge portion 171m along the outer circumferential edge of the covering member 171 is spot-welded at four equal intervals in a circumferential direction to an annular recessed-portion surrounding portion 113m extending around the recessed portion 113h of the case lid member 113. Accordingly, four spot welds 171y are formed in positions circumferentially spaced from each other at equal intervals, thereby fixing the covering member 171 to the battery case 110 (its case lid member 113). In the first embodiment, particularly, since the covering member 171 and the battery case 110 are made of the same material (aluminum), they can be reliably welded to each other.

On the other hand, the elastic member 179 consists of the insertion portion 173 and the annular pressure-contact portion 175 and the connecting portion 177 as mentioned above, which are integrally continuous to each other. This elastic member 179 is made of a rubber-like elastic body, concretely, ethylene propylene diene rubber (EPDM). The insertion portion 173 has a circular truncated cone shape including a top surface 173c smaller in diameter than the liquid inlet 113e, a bottom surface 173d larger in diameter than the top surface 173c and the liquid inlet 113e, and a peripheral surface 173f connecting them. This insertion portion 173 is joined, at its bottom surface 173d, to the center of the inner surface 171c of the covering member 171 and protrudes from the inner surface 171c and is inserted in the liquid inlet 113e.

In the first embodiment, the insertion portion 173 is press-fitted in the liquid inlet 113e so that the peripheral surface 173f of the insertion portion 173 is in press contact with the hole side surface 113f1 defining the liquid inlet 113e. Accordingly, the insertion portion 173 is compressed radially inward over its whole circumference. In the insertion portion 173, a stress directed to the outside in the radial direction is generated as indicated by right/left arrows in FIG. 5. Thus, the liquid inlet 113e is hermetically sealed by the insertion portion 173.

The annular pressure-contact portion 175 is substantially rectangular in cross section and circular in plan view. The outer diameter of this annular pressure-contact portion 175 is set to be smaller than the diameter of the recessed portion 113h (the outer diameter of the recessed-portion bottom surface 113f3). On the other hand, the inner diameter of the annular pressure-contact portion 175 is set to be larger than the diameter of the liquid inlet 113e. The height (thickness) of the annular pressure-contact portion 175 is slightly larger than the depth of the recessed portion 113h in a state before compression as shown in FIG. 7 and is equal to the depth of the recessed portion 113h in a compressed state as shown in FIG. 5.

The annular pressure-contact portion 175 is joined to the inner surface 171c of the covering member 171 so as to surround the insertion portion 173 and protrudes in an annular shape from the inner surface 171c. The annular pressure-contact portion 175 is compressed over its whole circumference in the thickness direction (up-and-down direction) under pressure by the covering member 171. In the annular pressure-contact portion 175, accordingly, a stress is generated in the thickness direction as indicated by up/down arrows in FIG. 5. Thus, the annular pressure-contact portion 175 is placed in close contact with the bottom surface 113f3 of the recessed portion 113h, thereby hermetically sealing between the inside of the liquid inlet 113e (battery inside) located radially more inside than the annular pressure-contact portion 175 and the outside (battery outside). As mentioned above, the liquid inlet 113e is also hermetically sealed by the insertion portion 173. Thus, the liquid inlet 113e is doubly sealed by the insertion portion 173 and the annular pressure-contact portion 175.

The connecting portion 177 is annular and is joined to the inner surface 171c of the covering member 171 and extends in an annular form from the inner surface 171c. This connecting portion 177 is interposed between the insertion portion 173 and the annular pressure-contact portion 175 and integral with them. The connecting portion 177 is provided with an annular connecting-portion groove 177v extending to surround the insertion portion 173. This groove 177v is an annular U-shaped groove having a U-like cross section, that is recessed toward the covering member 171 (on the upper side in FIGS. 5 and 7) and opens on the opposite side (on the case lid member 113 side, i.e., on the lower side in FIGS. 5 and 7).

The connecting portion 177 is configured so that, when the insertion portion 173 is press-fitted in the liquid inlet 113e and compressed radially inward, an inside portion 177p of the connecting portion 177 located radially more inside than the connecting-portion groove 177v is pulled inward in the radial direction. However, the presence of the groove 177v makes it difficult to pull an outside portion 177q located radially more outward than the groove 177v. Thus, the annular pressure-contact portion 175 continuous to the connecting portion 177 (its outside portion 177q) is less likely to be pulled radially inward.

Figure 25:
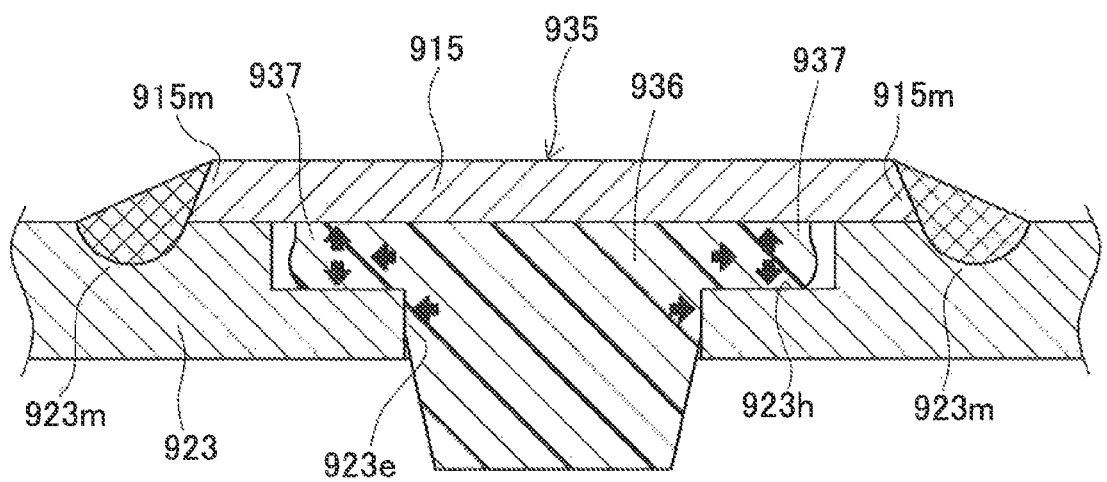
FIG. 25 is a partial enlarged longitudinal cross sectional view showing a liquid inlet, a sealing member, and its surroundings of a sealed battery in a third conventional example.

In this elastic member 179, a stress in the radial direction is hardly generated in the annular pressure-contact portion 175 as easily seen by comparison with FIG. 25. Even though the insertion portion 173 is press-fitted in the liquid inlet 113e and compressed radially inward as described above, the connecting portion 177 having the groove 177v is present between the insertion portion 173 and the annular pressure-contact portion 175. Thus, the radial stress generated in the insertion portion 173 is less likely to reach the annular pressure-contact portion 175.

A space KC is provided radially outside the annular pressure-contact portion 175. That is, the space KC is produced between an outer surface 175c2 of a surface 175c of the annular pressure-contact portion 175, the outer surface 175c2 being located radially outside than a press contact surface 175c1 in press contact with the bottom surface 113f3 of the recessed portion 113h, and the side surface 113f2 of the recessed portion 113h. The annular pressure-contact portion 175 is therefore expanded radially outward as it is compressed in the thickness direction between the inner surface 171c of the covering member 171 and the bottom surface 113f3 of the recessed portion 113h. Accordingly, any radial stress caused by a force applied from radially outside (from the side surface 113f2) is not generated in the annular pressure-contact portion 175.

As explained above, the battery 100 of the first embodiment includes the battery case 110 having the through hole (liquid inlet) 113e for communicating the inside with the outside of the battery 100, the electrode body 120 accommodated in the battery case 110, and the sealing member 170 hermetically sealing the through hole 113e from outside. The sealing member 170 includes the covering part (covering member) 171 that covers the through hole 113e from outside and is fixed to the battery case 110. The sealing member 170 includes the insertion portion 173 made of a rubber-like elastic body and formed to protrude from the inner surface 171c of the covering part 171, which is a surface located facing the battery case 110, and inserted in the through hole 113e. The sealing member 170 further includes the annular pressure-contact portion 175 made of a rubber-like elastic body and formed to protrude from the inner surface 171c in an annular form surrounding the insertion portion 173. This annular pressure-contact portion 175 is placed in hermetically press contact with the hole-surrounding portion (the recessed-portion bottom surface) 113f3 located around the through hole 113e of the battery case 110. Furthermore, the sealing member 170 includes the connecting portion 177 made of a rubber-like elastic body and formed to protrude in an annular shape from the inner surface 171c and integrally interposed between the insertion portion 173 and the annular pressure-contact portion 175. This connecting portion 177 includes the annular groove 177v surrounding the insertion portion 173.

In this battery 100, the insertion portion 173 and the annular pressure-contact portion 175 are formed to be continuous to each other via the connecting portion 177 having the groove 177v. Accordingly, even when the insertion portion 173 inserted in the liquid inlet 113e is compressed radially inward, the annular pressure-contact portion 175 is less likely to be pulled radially inward. Thus, the stress in the radial direction is hardly generated in the annular pressure-contact portion 175, so that the annular pressure-contact portion 175 can keep hermeticity of the battery for a long term.

In the first embodiment, furthermore, the insertion portion 173 is press-fitted in the through hole (liquid inlet) 113e to hermetically seal the through hole 113e. This battery 100 sealed by not only the annular pressure-contact portion 175 but also the insertion portion 173 can keep the hermeticity through the sealing member 170 for a long period.

In the first embodiment, the inside pressure of the battery case 110 is reduced below atmospheric pressure. Accordingly, even when gas is generated in the battery case 110 due to the use (charge and discharge), the inside pressure of the battery case 110 can be prevented from early increasing. The safety of the battery 100 can be thus increased.

In the first embodiment, the covering part (covering member) 171 is welded, through its circumferential edge portion 171m, to the battery case 110 at a plurality of spot welds 171y spaced from each other. This battery 100 with the liquid inlet 113e hermetically sealed by the annular pressure-contact portion 175 as mentioned above does not necessarily need to weld the covering member 171 over its whole circumference to the battery case 110 to seal between them. In addition, if the covering member 171 is welded over the whole circumference to the battery case 110 (the recessed-portion surrounding portion 113m of the case lid member 113), the number of work steps is increased, leading to cost increase. In the battery 100, to the contrary, the covering member 171 has only to be spot-welded to the battery case 110 at a plurality of places. Thus, the number of work steps is small, leading to cost reduction of the battery 100.

In the first embodiment, the battery case 110 includes the safety valve 113j in a position close to the through hole (liquid inlet) 113e and the sealing member 170. Since the liquid inlet 113e and the sealing member 170 are located close to the safety valve 113j, when a discharge path for discharging gas and electrolyte through the safety valve 113j is to be designed and configured, a discharge path for discharging gas and others through the liquid inlet 113e can also be easily designed and configured so as to share the discharge path used for the safety valve 113j.

A method for producing the above battery 100 will be explained below. The strip-shaped positive electrode sheet 121 and the strip-shaped negative electrode sheet 131, separately produced, are laminated by interposing the strip-shaped separators 141 (see FIG. 3) and wound around a winding core about the axis line AX. Thereafter, this assembly is compressed into a flat shape, forming the electrode body 120 (see FIG. 2).

The case lid member 113 formed with the safety valve 113j, the liquid inlet 113e, and others, the extending terminal members 151, and the bolts 153 are prepared and set in a die for injection molding. The insulation member 155 is formed by injection molding and then the positive electrode terminal 150 and the negative electrode terminal 160 are fixed to the case lid member 113 (see FIG. 4).

Then, the positive electrode terminal 150 and the positive current collecting part 121m of the electrode body 120 are connected (welded) to each other. The negative electrode terminal 160 and the negative current collecting part 131m of the electrode body 120 are connected (welded) to each other. Thereafter, the case body member 11 and the insulation film envelope 115 are prepared, the electrode body 120 is set in the case body member 111 through the insulation film envelope 115, and the opening 111h of the case main body 111 is closed by the case lid member 113. The case main body 111 and the case lid member 113 are welded by laser welding, forming the battery case 110 (see FIG. 1).

Separately, the sealing member 170 consisting of the covering member 171 and the elastic member 179 (see FIG. 7) is produced. To be concrete, the covering member 171 made of a metal plate is set in a die for injection molding. The elastic member 179 including the insertion portion 173, annular pressure-contact portion 175, and connecting portion 177 is produced by injection molding.

The above battery is put in a vacuum chamber, and the inside of this vacuum chamber is depressurized. A liquid injection nozzle is inserted in the liquid inlet 113e and the electrolyte 117 is injected in the battery case 110 through the nozzle. Then, the area around the liquid inlet 113e (the recessed portion 113h, the recessed-portion surrounding portion 113m, and others) is wiped with nonwoven cloth for cleaning.

Successively, first sealing is performed under reduced pressure. Specifically, the insertion portion 173 of the sealing member 170 is press-fitted in the liquid inlet 113e from outside (from above) of the battery case 110 (the case lid member 113). This hermetically seals between the insertion portion 173 and the liquid inlet 113e. At that time, the insertion portion 173, which also serves as a positioning guide, can accurately position the sealing member 170 with respect to the liquid inlet 113e.

Thereafter, the internal pressure of the vacuum chamber is returned to atmospheric pressure and then the battery is taken out of the vacuum chamber. The inside of the battery case 110 is thus in a reduced pressure state below atmospheric pressure. Consequently, second sealing mentioned below can be performed under atmospheric pressure while the inside of the battery case 110 is kept in the reduced pressure state.

Figure 10:
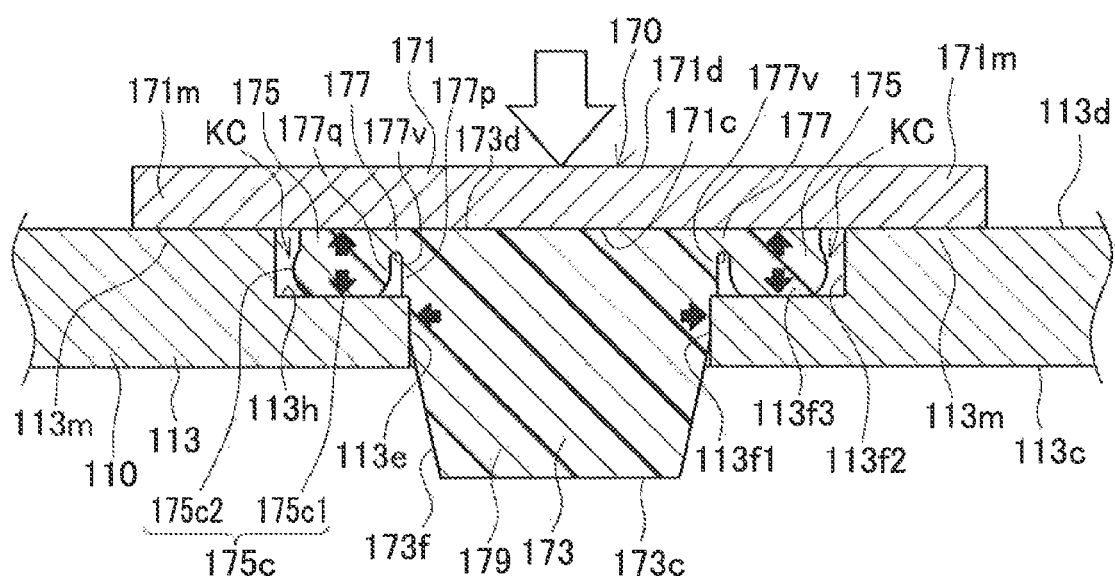
FIG. 10 is a view for explanation of a method for producing a lithium ion secondary battery, showing how to press-fit an insertion portion of the sealing member in the liquid inlet in in the first embodiment.

The second sealing is successively performed under atmospheric pressure. As shown in FIG. 10, the covering member 171 of the sealing member 170 is pressed against (downward) the case lid member 113 to bring the annular pressure-contact portion 175 into pressure contact with the bottom surface 113f3 of the recessed portion 113h of the case lid member 113 and also place the circumferential edge portion 171m of the covering member 171 into contact with the recessed-portion surrounding portion 113m of the case lid member 113.

Thereafter, the circumferential edge portion 171m of the covering member 171 is welded to the recessed-portion surrounding portion 113m of the case lid member 113. Specifically, while the sealing member 170 is pressed against the case lid member 113, the circumferential edge portion 171m of the covering member 171 is spot-welded to the recessed-portion surrounding portion 113m of the case lid member 113 at four equal intervals in the circumferential direction by laser welding. This causes the annular pressure-contact portion 175 to closely contact with the recessed-portion bottom surface 113f3, so that between the inside of the liquid inlet 113e (battery inside) located more radially inward than the annular pressure-contact portion 175 is hermetically sealed from the outside (battery outside). Since the liquid inlet 113e is also hermetically sealed by the insertion portion 173 as described above, the liquid inlet 113e is doubly sealed by the insertion portion 173 and the annular pressure-contact portion 175.

In a conditioning step (an initial charge and discharge step), subsequently, this battery 100 is charged and discharged. In this way, the battery 100 is completed.

(Second Embodiment)

Figure 11:
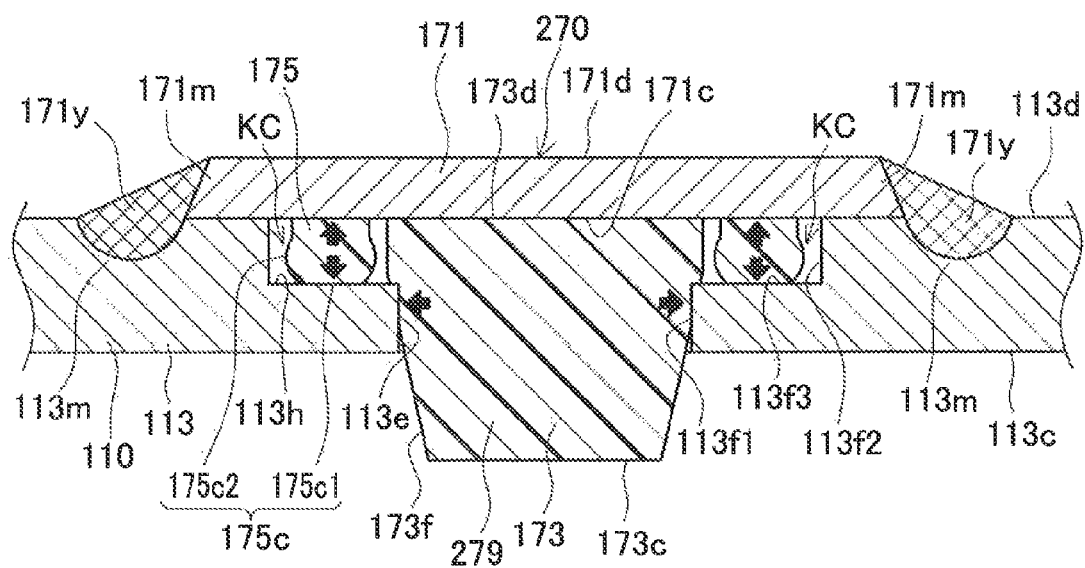
FIG. 11 is a partial enlarged longitudinal cross sectional view showing a liquid inlet, a sealing member, and its surroundings in a second embodiment.
Figure 12:
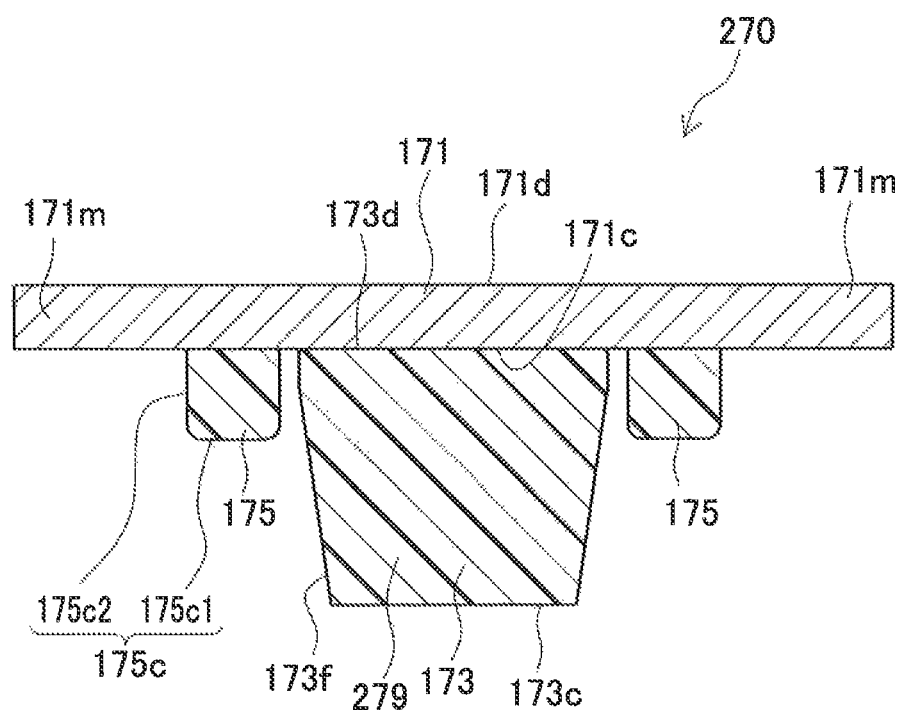
FIG. 12 is a longitudinal cross sectional view showing the sealing member in the second embodiment.

A second embodiment will be explained below. A lithium ion secondary battery (a hermetically sealed battery) 200 of the second embodiment includes a sealing member 270 (see FIGS. 11 and 12) different in configuration from the sealing member 170 of the first embodiment. Remaining parts are similar to those of the first embodiment and thus are omitted or explained briefly.

An elastic member 279 of a sealing member 270 of the second embodiment includes an insertion portion 173 and an annular pressure-contact portion 175 similar to those of the first embodiment. This elastic member 279 is however configured so that the insertion portion 173 and the annular pressure-contact portion 175 are separated from each other, and any connecting portion such as the connecting portion 177 of the first embodiment is absent.

In this elastic member 279, therefore, even when the insertion portion 173 is inserted in the liquid inlet 113e, the stress in the radial direction is not generated in the annular pressure-contact portion 175. Specifically, since the insertion portion 173 and the annular pressure-contact portion 175 are apart from each other, even if the insertion portion 173 is compressed radially inward when it is press-fitted in the liquid inlet 113e, the stress in the radial direction generated in the insertion portion 173 is not transmitted to the annular pressure-contact portion 175. On the radial outside of the annular pressure-contact portion 175, a space KC is provided as in the first embodiment. Accordingly, any radial stress caused by a force applied from radially outside (from the recessed-portion side surface 113f2) is not generated in the annular pressure-contact portion 175.

As explained above, the battery 200 of the second embodiment is configured so that the insertion portion 173 and the annular pressure-contact portion 175 are spaced from each other. Since the insertion portion 173 and the annular pressure-contact portion 175 are independent from each other, even if the insertion portion 173 is compressed radially inward by the liquid inlet 113e (the hole side surface 113f1), the annular pressure-contact portion 175 is not pulled in the radial direction. Consequently, the radial stress is not generated in the annular pressure-contact portion 175, so that the annular pressure-contact portion 175 can keep hermeticity of the battery for a long period. Moreover, similar parts to those of the first embodiment can provide the same operations and effects as those in the first embodiment.

(Third Embodiment)

A third embodiment will be explained below. A lithium ion secondary battery (a hermetically sealed battery) 300 of the third embodiment includes a sealing member 370 (see FIGS. 13 and 14) different in configuration from the sealing member 170 or 270 of the first or second embodiment. Remaining parts are similar to those of the first embodiment and thus are omitted or explained briefly.

Figure 14:
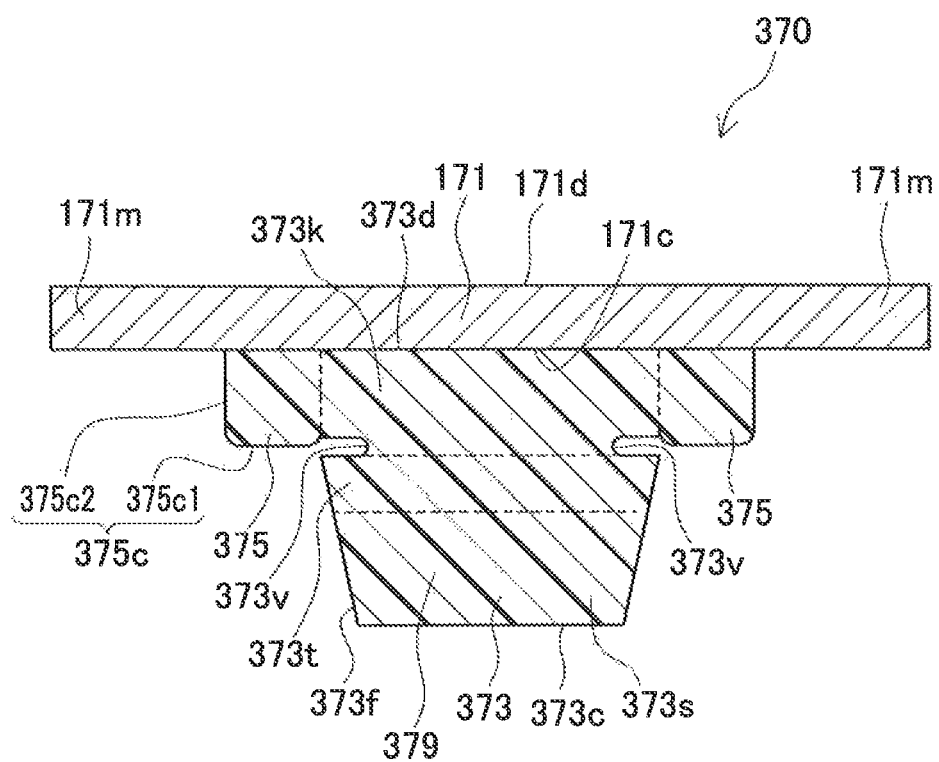
FIG. 14 is a longitudinal cross sectional view showing the sealing member in the third embodiment.

The sealing member 370 of the third embodiment includes the covering member 171 identical to that of the first embodiment and an elastic member 379 different from the first embodiment. This elastic member 379 of the sealing member 370 consists of an insertion portion 373 and an annular pressure-contact portion 375. The insertion portion 373 and the annular pressure-contact portion 375 are directly continuous to each other as one piece without interposing therebetween a connecting portion such as the connecting portion 177 of the first embodiment. In FIG. 14, the boundary between the insertion portion 373 and the annular pressure-contact portion 375 is indicated by dotted lines. In addition, as mentioned later, the third embodiment differs from the first embodiment in the insertion portion 373 formed with a constricted base-portion groove 373v.

The insertion portion 373 has a circular truncated cone shape including a small-diameter top surface 373c and a large-diameter bottom surface 373d, and a peripheral surface 373f connecting them. This insertion portion 373 protrudes from the center of the inner surface 171c of the covering member 171 and is inserted in the liquid inlet 113e. This insertion portion 373 consists of three sections as indicated by dotted lines in FIG. 14; i.e., a distal end portion 373s, a contact portion 373t, and a base portion 373k arranged in a vertical direction in FIG. 14.

Figure 13:
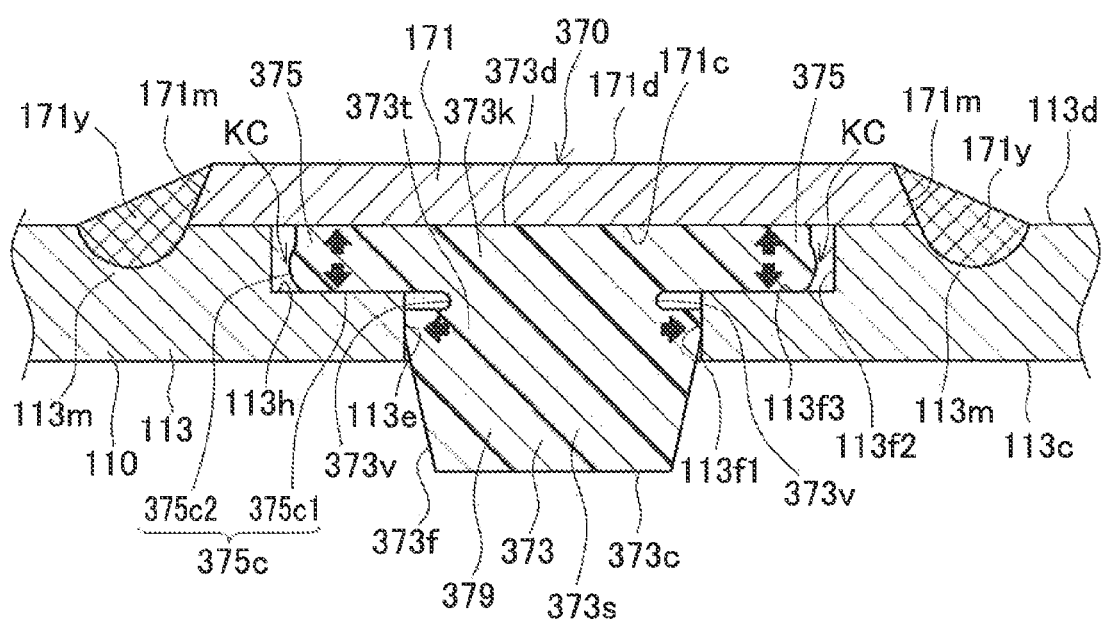
FIG. 13 is a partial enlarged longitudinal cross sectional view showing a liquid inlet, a sealing member, and it surroundings in a third embodiment.

The contact portion 373t located in the middle section is a portion that comes into contact (more concretely, into pressure contact) with the liquid inlet 113e (the hole side surface 113f1) when the insertion portion 373 is inserted (more concretely, press-fitted) in the liquid inlet 113e (see FIG. 13). The distal end portion 373s is a circular truncated cone-shaped portion located more inside the battery (on the lower side in FIG. 13) than the contact portion 373t. The base portion 373k is a circular column-shaped portion located more outside the battery (on the covering member 171 side, on the upper side in FIG. 13) than the contact portion 373t. In the third embodiment, the base portion 373k is formed, at a boundary with the contact portion 373t, with the groove 373v annularly constricted radially inward in a U-like shape.

The annular pressure-contact portion 375 is substantially rectangular in cross section and annular in plan view. This annular pressure-contact portion 375 is directly continuous to the insertion portion 373 (its base portion 373k) so as to surround the insertion portion 373 and is joined to the inner surface 171c of the covering member 171. This annular pressure-contact portion 375 is compressed over its whole circumference in the thickness direction (in the up-and-down direction) under pressure by the covering member 171. Accordingly, in the annular pressure-contact portion 375, the stress is generated in the thickness direction as indicated by up/down arrows in FIG. 13. The annular pressure-contact portion 375 is thus placed in close contact with the bottom surface 113f3 of the recessed portion 113h, thereby hermetically sealing the inside of the battery case 110.

The elastic member 379 of the third embodiment is also configured so that the insertion portion 373 is press-fitted in the liquid inlet 113e in a state where the insertion portion 373 (its contact portion 373t) is in press-contact with the hole side surface 113f1 defining the liquid inlet 113e. Thus, the insertion portion 373 (its contact portion 373t) is compressed radially inward over its whole circumference. In the insertion portion 373, a stress directed to the outside in the radial direction is generated as indicated by right/left arrows in FIG. 13. Thus, the liquid inlet 113e is tightly sealed by the insertion portion 373 (its contact portion 373t).

It should be noted that, in the third embodiment, the base portion 373k located closer to the covering member 171 than the contact portion 373t is formed with the groove 373v at the boundary with the contact portion 373t. Accordingly, even when the contact portion 373t is compressed radially inward by the liquid inlet 113e (the hole side surface 113f1), a part of the base portion 373k close to the covering member 171, above the groove 373v (on the upper side in FIG. 13), is less likely to be compressed radially inward. Thus, the radial stress is hardly generated in the base portion 373k. Further, the annular pressure-contact portion 375 located radially outside and continuous to the base portion 373k is also less likely to be pulled radially inward, so that the radial stress is also hardly generated in the annular pressure-contact portion 375. In other words, the radial stress generated in the contact portion 373t by press-fit is less likely to reach the annular pressure-contact portion 375.

In the third embodiment, a space KC is provided radially outside the annular pressure-contact portion 375 as in the first and second embodiments. Specifically, the space KC is produced between an outer surface 375c2 located radially outside than a press contact surface 375c1 of a surface 375c of the annular pressure-contact portion 375 and the side surface 113f2 of the recessed portion 113h. Accordingly, any radial stress caused by a force applied from radially outside (from the side surface 113f2) is not generated in the annular pressure-contact portion 375.

As explained above, the battery 300 of the third embodiment is configured so that the insertion portion 373 and the annular pressure-contact portion 375 of the elastic member 379 are directly continuous to each other in one piece. In the insertion portion 373, the base portion 373k located closer to the covering member 171 than the contact portion 373t contacting with the through hole (liquid inlet) 113e is formed with the groove 373v constricted in the radial direction of the base portion 373K. Therefore, even when the insertion portion 373 (its contact portion 373t) inserted in the liquid inlet 113e is compressed radially inward, the annular pressure-contact portion 375 is less likely to be pulled radially inward. Thus, the stress in the radial direction is also unlikely to be generated in the annular pressure-contact portion 375, so that the annular pressure-contact portion 375 can keep hermeticity of the battery for a long period. Moreover, similar parts to those of the first embodiment can provide the same operations and effects as those in the first embodiment.

(Fourth Embodiment)

A fourth embodiment will be explained below. A lithium ion secondary battery (a hermetically sealed battery) 400 of the fourth embodiment includes a sealing member 470 (see FIGS. 15 to 17) different in configuration from the sealing members 170, 270, and 370 of the first to third embodiments. Remaining parts are similar to those of the first embodiment and thus are omitted or explained briefly.

The sealing member 470 of the fourth embodiment includes the covering member 171 and further an elastic member 479 consisting of the insertion portion 173, an annular pressure-contact portion 475, and the connecting portion 177. The covering member 171, and the insertion portion 173, and the connecting portion 177 of the elastic member 479 are identical to those in the first embodiment. In the first embodiment, the circumferential edge portion 171m of the covering member 171 is welded to the recessed-portion surrounding portion 113m of the case lid member 113 circumferentially at four spot welds 171y (see FIGS. 5 and 6). In the fourth embodiment, on the other hand, the spot welds 171y are formed only at three places and a left spot weld 171y shown in FIGS. 5 and 6 is not formed (see FIG. 15).

The annular pressure-contact portion 475 is substantially rectangular in cross section and annular in plan view. This annular pressure-contact portion 475 is joined with the inner surface 171c of the covering member 171 so as to surround the insertion portion 173. This annular pressure-contact portion 475 is compressed over its whole circumference in the thickness direction (in the up-and-down direction) under pressure by the covering member 171. Accordingly, in the annular pressure-contact portion 475, a stress is generated in the thickness direction as indicated by up/down arrows in FIG. 15. The annular pressure-contact portion 475 is thus placed in close contact with the bottom surface 113f3 of the recessed portion 113h, thereby hermetically sealing the inside of the battery case 110. Since the connecting portion 177 having the groove 177v is interposed between the insertion portion 173 and the annular pressure-contact portion 475 as in the first embodiment, the stress in the radial direction generated in the insertion portion 173 is less likely to reach the annular pressure-contact portion 475.

Figure 15:
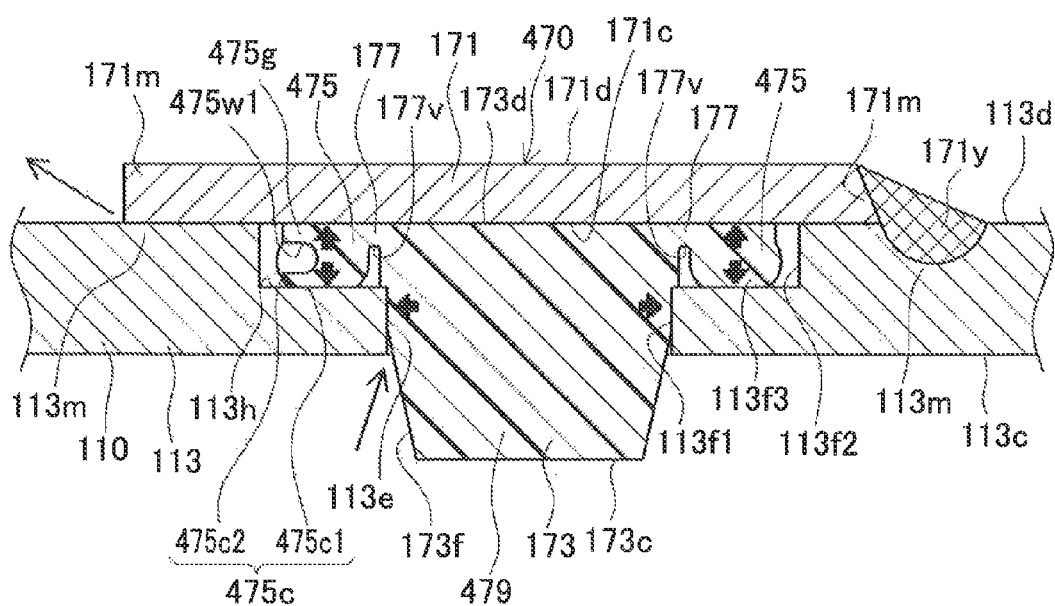
FIG. 15 is a partial enlarged longitudinal cross sectional view showing a liquid inlet, a sealing member, and its surroundings in a fourth embodiment.
Figure 16:
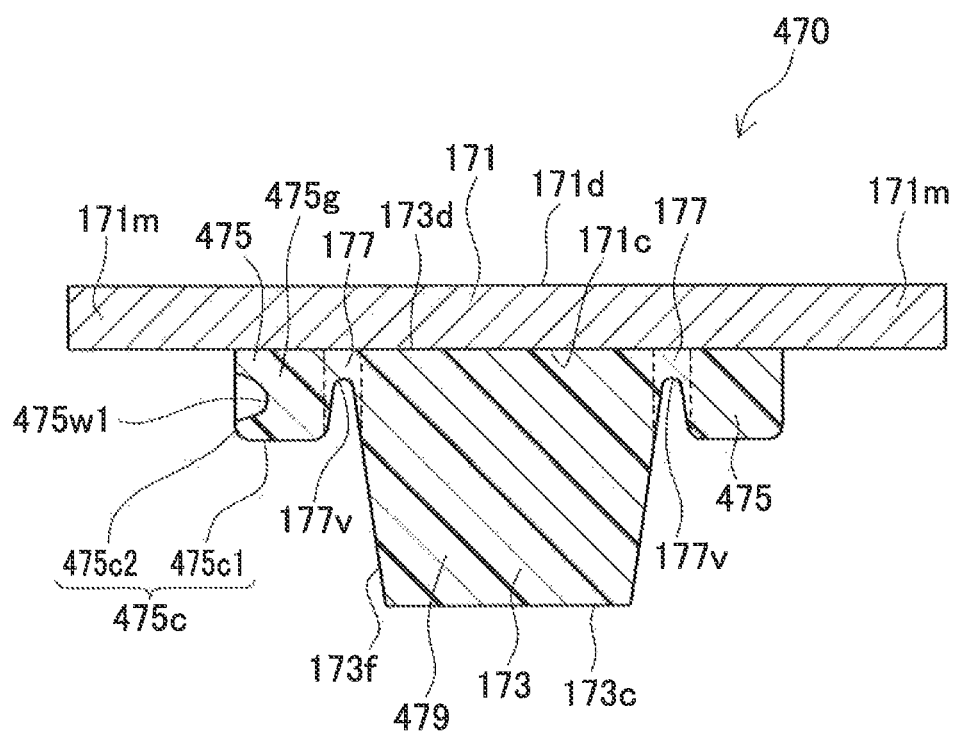
FIG. 16 is a longitudinal cross sectional view showing the sealing member in the fourth embodiment.
Figure 17:
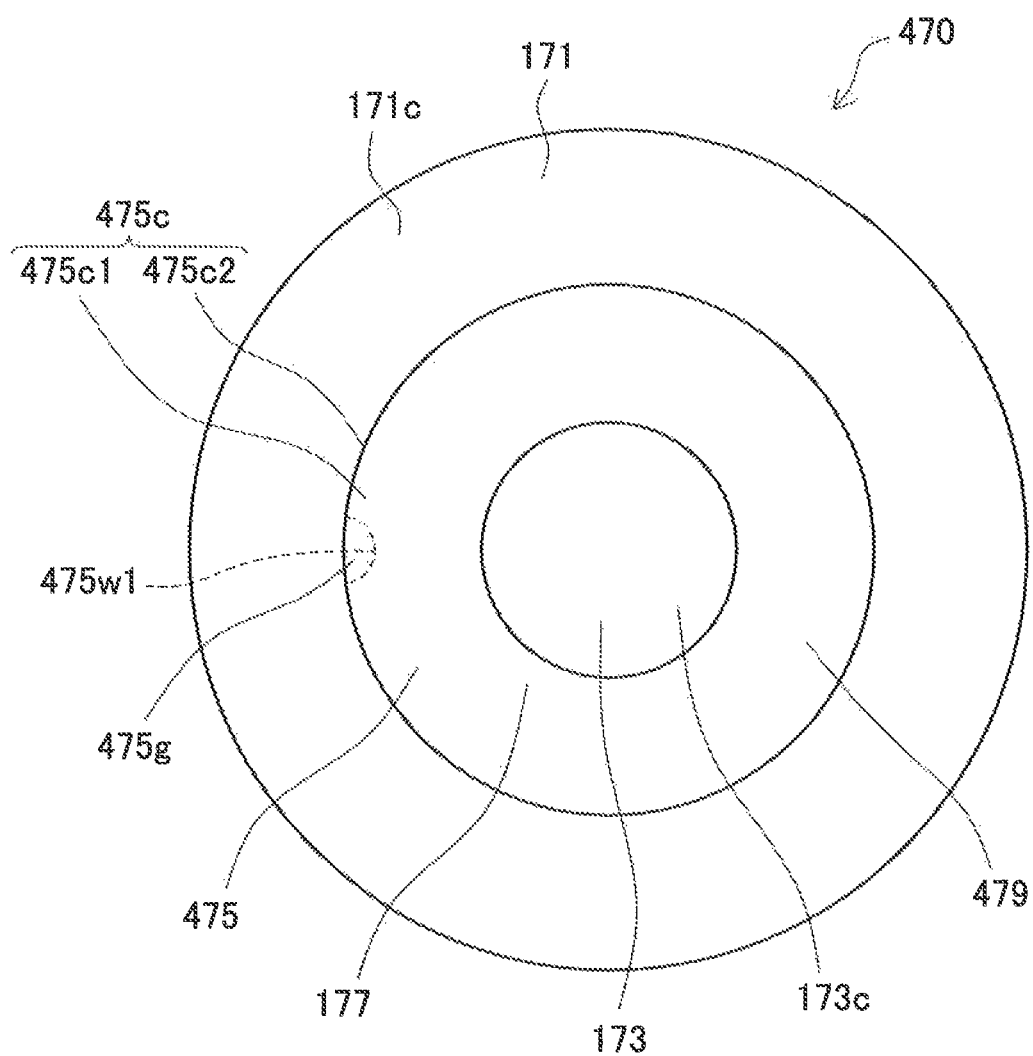
FIG. 17 is a plan view of the sealing member seen from below in FIG. 16 in the fourth embodiment.

This annular pressure-contact portion 475 further includes a recess 475w1 in a low-contact portion 475g that is a part of the annular pressure-contact portion 475 in the circumferential direction (in the fourth embodiment, a nearest portion to the safety valve 113j (a left side in FIGS. 15 to 17). To be specific, this recess 475w1 is formed in an outer surface 475c2 of a surface 475c of the annular pressure-contact portion 475, the outer surface 475c2 being located more outside in the radial direction than a pressure contact surface 475c1 press-contacting with the recessed-portion bottom surface 113f3. This recess 475w1 is recessed radially inward and opens radially outward.

With the presence of this recess 475w1, the low-contact portion 475g of the annular pressure-contact portion 475 provides a lower sealing strength than other portions of the annular pressure-contact portion 475 in the circumferential direction. In the low-contact portion 475g with the recess 475w1, specifically, the pressure-contact surface 475c of the annular pressure-contact portion 475 is placed in pressure contact with the recessed-portion bottom surface 113f3 of the case lid member 113 at a lower pressure than other portions in the circumferential direction. Thus, in the low-contact portion 475g of the annular pressure-contact portion 475, the contact strength is low, reducing the sealing performance than the other portions in the circumferential direction.

As explained above, the battery 400 of the fourth embodiment is configured as in the first embodiment such that the insertion portion 173 and the annular pressure-contact portion 475 are continuous to each other via the connecting portion 177 having the groove 177v. Even when the insertion portion 173 inserted in the liquid inlet 113e is compressed radially inward, therefore, the annular pressure-contact portion 475 is less likely to be pulled radially inward. Thus, the radial stress is hardly generated in the annular pressure-contact portion 475, so that the annular pressure-contact portion 475 can keep hermeticity of the battery for a long period.

In the fourth embodiment, furthermore, the recess 475w1 is provided in the low-contact portion 475g of the annular pressure-contact portion 475. In addition, the covering member 171 of the sealing member 470 is welded to the case lid member 113 by spot welding, not by all-around welding. Thus, the outside of the annular pressure-contact portion 475 (the outside in the radial direction) is communicated with the outside of the battery case 110.

Accordingly, if the annular pressure-contact portion 475 of the sealing member 470 and the insertion portion 173 are deteriorated with age and the annular pressure-contact portion 475 could not provide sufficient sealing strength, the gas generated in the battery case 110 and the electrolyte are released to the radial outside of the annular pressure-contact portion 475 through the low-contact portion 475g having the lowest sealing performance in the annular pressure-contact portion 475. Furthermore, this gas and others are discharged to the outside of the battery case 110 through between the covering member 171 and the recessed-portion surrounding portion 113m as indicated by an arrow in FIG. 15. Since the discharged gas and others tend to travel toward the safety valve 113j, a discharge path provided for the safety valve 113j can be easily shared. Moreover, similar parts to those of the first embodiment can provide the same operations and effects as those in the first embodiment.

In the fourth embodiment, the annular pressure-contact portion 475 is provided with the recess 475w1 in the outer surface 475c2 of the surface 475c to reduce the sealing performance of the low-contact portion 475g of the annular pressure-contact portion 475. However, the formation position and the configuration of the recess are not limited thereto. For instance, as shown in FIG. 18, a recess 475w2 may be provided to be recessed from inside to outside in the radial direction of the annular pressure-contact portion 475 to thereby reduce the sealing performance of the low-contact portion 475g of the annular pressure-contact portion 475.

Figure 19:
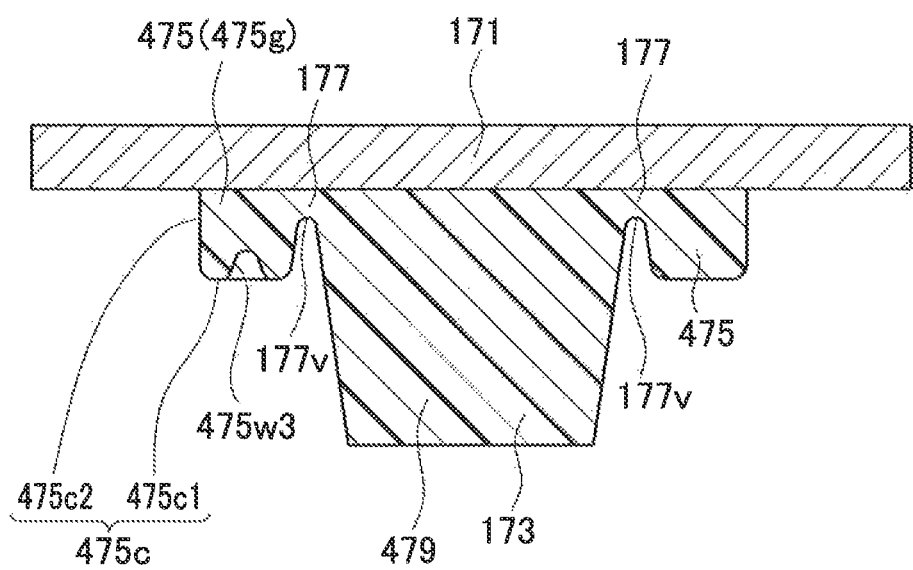
FIG. 19 is a longitudinal cross sectional view showing a sealing member in a second modified example of the fourth embodiment.
Figure 20:
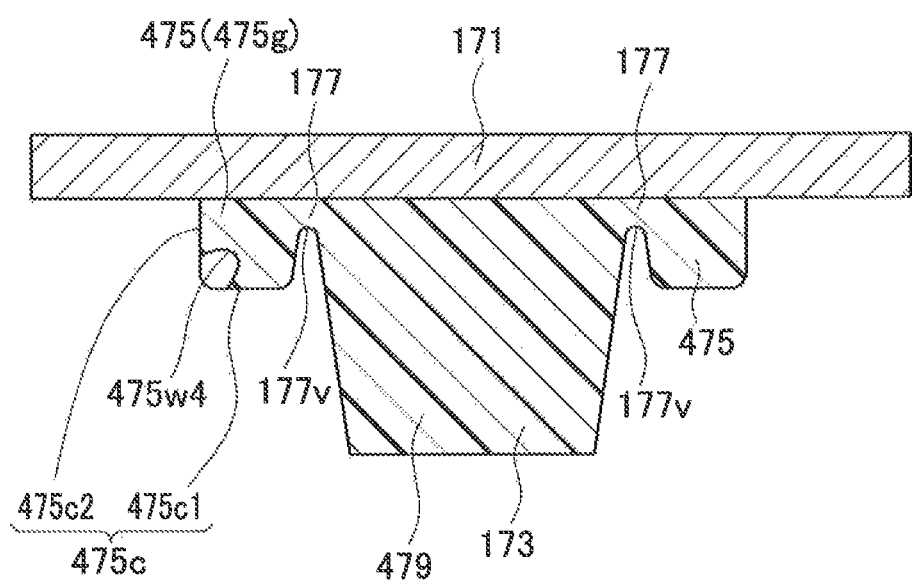
FIG. 20 is a longitudinal cross sectional view showing a sealing member in a third modified example of the fourth embodiment.

Furthermore, as shown in FIG. 19, a recess 475w3 may be provided to be recessed from the pressure contact surface 475c1 of the annular pressure-contact portion 475 toward the covering member 171 to thereby reduce the sealing performance of the low-contact portion 475g of the annular pressure-contact portion 475. As another alternative, as shown in FIG. 20, a recess 475w4 may be provided at a boundary between the outer surface 475c2 and the pressure contact surface 475c1 of the annular pressure-contact portion 475 to thereby reduce the sealing performance of the low-contact portion 475g of the annular pressure-contact portion 475.

Figure 18:
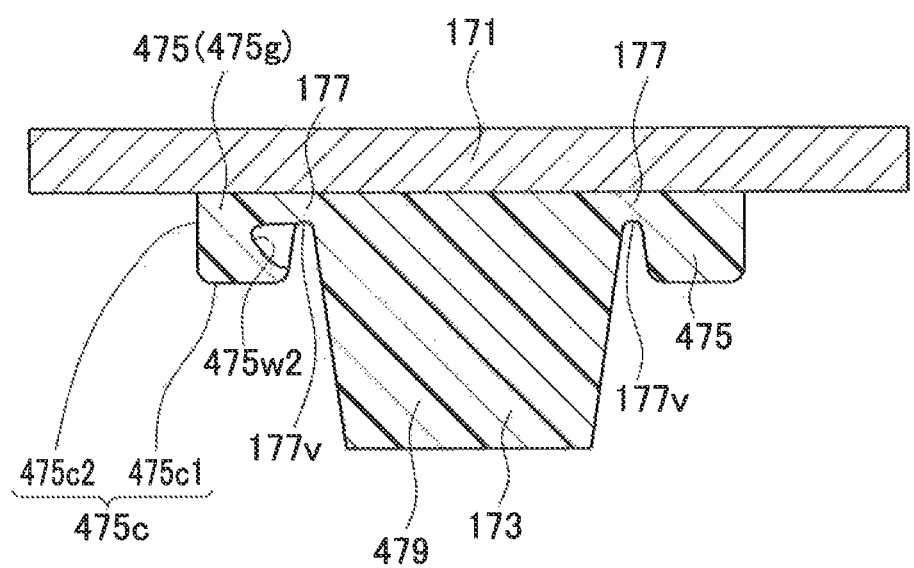
FIG. 18 is a longitudinal cross sectional view showing a sealing member in a first modified example of the fourth embodiment.

In the case where the recess 475w2 shown in FIG. 18 is provided, similarly in the case of the recess 475w1 shown in FIGS. 15 and 16, the pressure at which the pressure contact surface 475c pressure-contacting with the recessed-portion bottom surface 113f3 is smaller in the low-contact portion 475g than in the other portion of the annular pressure-contact portion 475 in the circumferential direction. This decreases the sealing performance in this low-contact portion 475g. On the other hand, in the case of the recess 475w3 shown in FIG. 19 or the recess 475w4 shown in FIG. 20, the area (pressure contact area) of the pressure contact surface 475c1 pressure-contacting with the recessed-portion bottom surface 113f3 is smaller in the low-contact portion 475g than in the other portion of the annular pressure-contact portion 475 in the circumferential direction. This decreases the sealing performance in this low-contact portion 475g.

(Fifth Embodiment)

Figure 21:
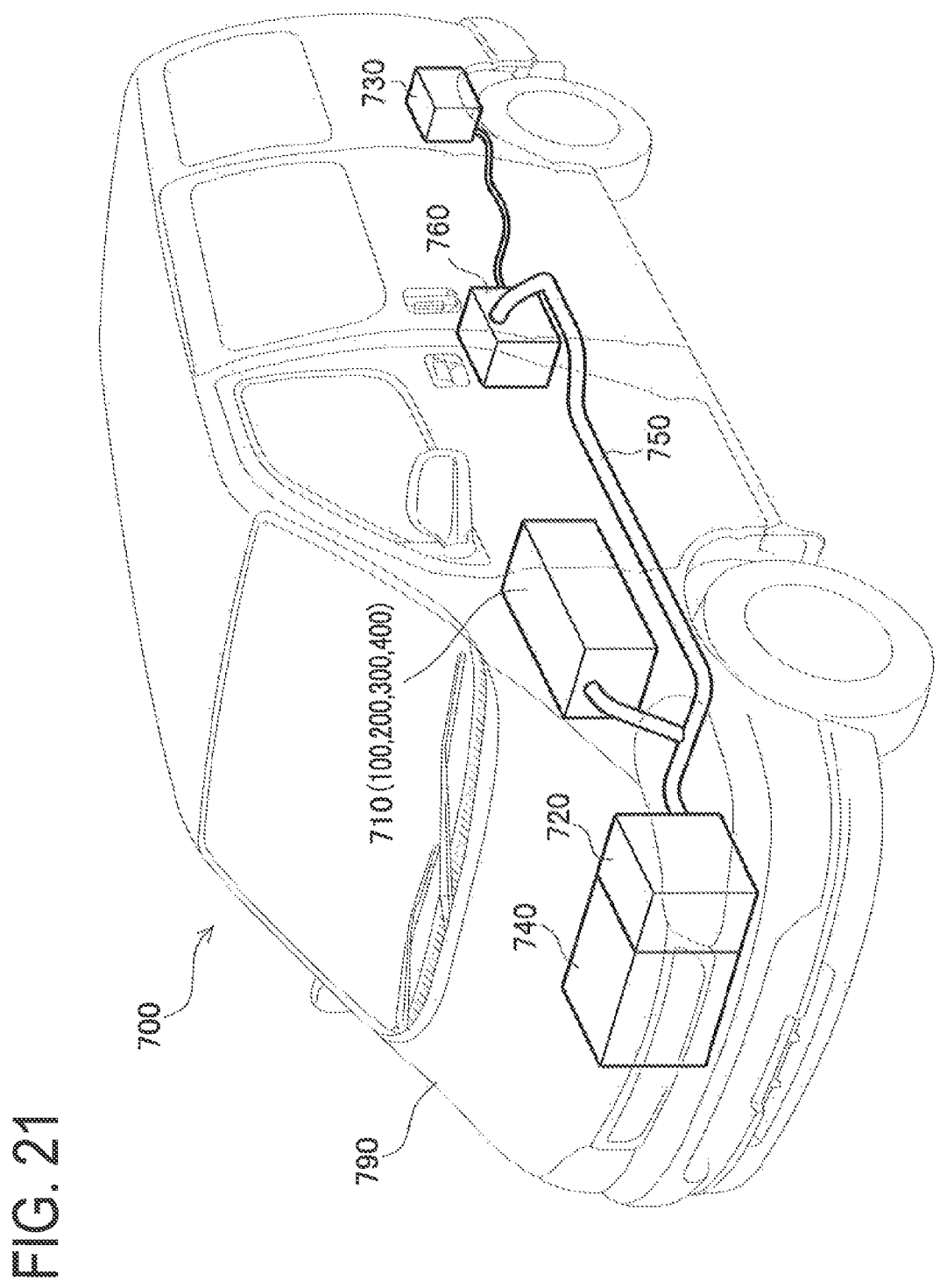
FIG. 21 is an explanatory view showing a hybrid car in a fifth embodiment.

A fifth embodiment will be explained below. A hybrid car (vehicle) 700 (hereinafter, also simply referred to as a car 700) of the fifth embodiment mounts the battery 100 of the first embodiment uses electric energy stored in the battery 100 as the whole or part of drive energy of a drive source (see FIG. 21).

This car 700 is a hybrid car that mounts an assembled battery 710 consisting of a plurality of the batteries 100 and is driven by use of an engine 740, a front motor 720, and a rear motor 730 in combination. Specifically, this car 700 includes, in its car body 790, the engine 740, the front motor 720, the rear motor 730, the assembled battery 710 (the batteries 100), a cable 750, and an inverter 760. This car 700 is configured to drive the front motor 720 and the rear motor 730 by using the electric energy stored in the assembled battery 710 (the batteries 100).

As explained above, each battery 100 can hermetically seal the liquid inlet 113e by the sealing member 170 for a long period and thus can enhance the durability of the car 700. Instead of the battery 100 of the first embodiment, alternatively, the battery 200, 300, or 400 of the second to fourth embodiments may be mounted.

(Sixth Embodiment)

Figure 22:
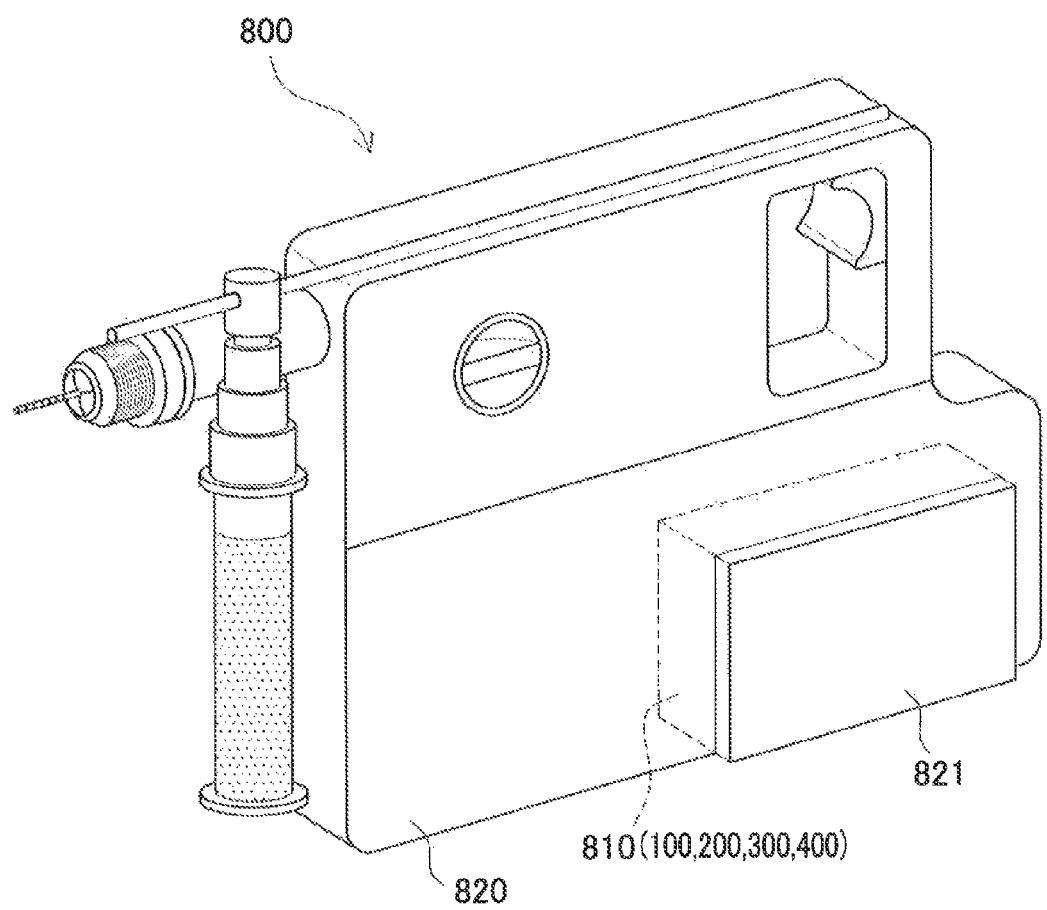
FIG. 22 is an explanatory view showing a hammer drill in a sixth embodiment.
Figure 23:
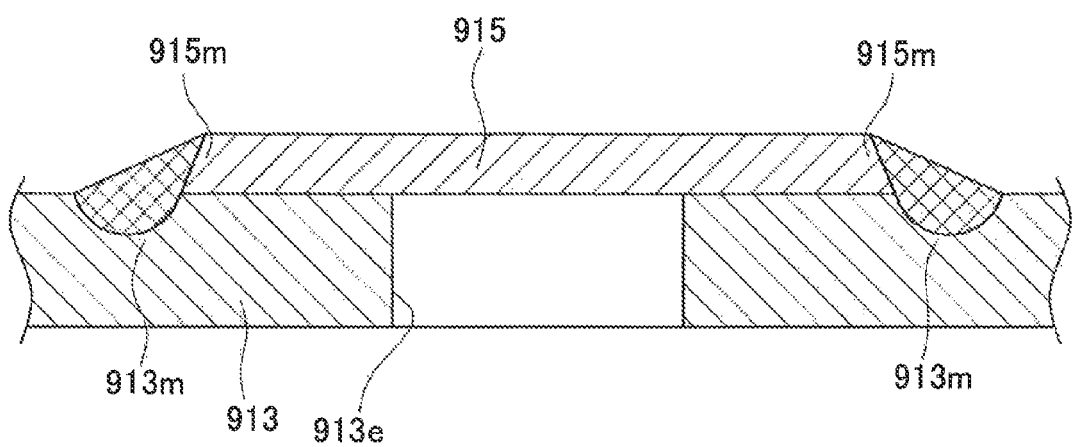
FIG. 23 is a partial enlarged longitudinal cross sectional view showing a liquid inlet, a sealing member, and its surroundings of a sealed battery in a first conventional example.
Figure 24:
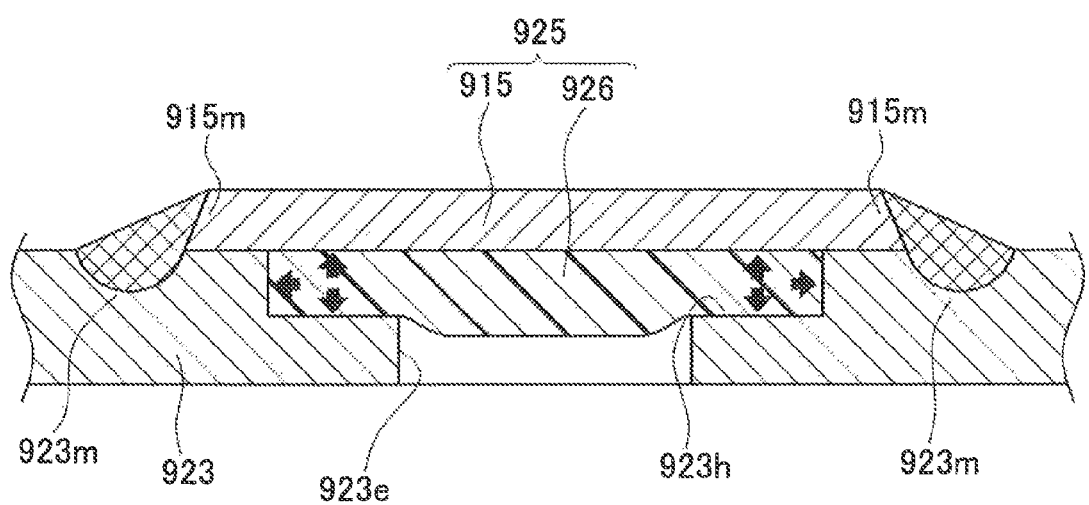
FIG. 24 is a partial enlarged longitudinal cross sectional view showing a liquid inlet, a sealing member, and its surroundings of a sealed battery in a second conventional example.

A sixth embodiment will be explained below. A hammer drill 800 of the sixth embodiment is a battery-using device that mounts the battery 100 of the first embodiment (see FIG. 22). This hammer drill 800 is configured such that a battery pack 810 including the battery 100 is accommodated on a bottom part 821 of a main unit 820 to utilize the battery pack 810 as an energy source to drive the drill.

As explained above, the battery 100 can hermetically seals the liquid inlet 113e by the sealing member 170 for a long period and thus can enhance the durability of the hammer drill 800. Instead of the battery 100 of the first embodiment, alternatively, the battery 200, 300, or 400 of the second to fourth embodiments may be mounted.

The present invention is explained in the above first to sixth embodiments but is not limited thereto. The invention may be embodied in other specific forms without departing from the essential characteristics thereof.

In the first to fourth embodiments, for instance, the "through hole" that communicates the inside with the outside of the battery case is exemplified by the liquid inlet 113e for injecting the electrolyte 117, but it is not limited thereto. Another example of the through hole is an air vent to release gas from the inside of the battery case. Although the "through hole" in the first to fourth embodiments is provided in the case lid member 113 of the battery case 110, the formation position of the through hole is not limited thereto. For instance, the through hole may also be provided in a side surface or a bottom surface of the case body member 111. The shape of the "through hole" is circular in the above embodiments, but is not limited to this. For example, the shape of the through hole may be elliptical in plan view, oblong or oval in plan view, rectangular in plan view, or polygonal in plan view, etc.

The first to fourth embodiments shows, an example of the "electrode body", the wound-type electrode body 120 in which the positive electrode sheet 121 and the negative electrode sheet 131, each being of a strip-shape, are laminated and wound together by interposing the separators 141. However, the configuration of the electrode body 120 is not limited thereto. For instance, the electrode body may be formed as a lamination-type configuration in which a plurality of positive electrode sheets and a plurality of negative electrode sheets, each having a predetermined shape (e.g., a rectangular shape), are alternately laminated by interposing separators.

Although the first to fourth embodiments show, as one example of the "covering part", the covering member 171 made of the same material (aluminum) as that of the battery case 110, the material of the covering part may be appropriately changed. In the first to fourth embodiments, the covering member 171 is fixed to the battery case 110 by spot welding, but the fixing method is not limited to this. For instance, the covering member 171 may be fixed to the battery case 110 by all-around welding. As another alternative, the covering member 171 may be fixed to the battery case 110 by use of a brazing material or an adhesive.

As the "insertion portion" of the sealing member, the first to fourth embodiments exemplify the circular truncated cone-shaped insertion portions 173 and 373. The shape and the size of each insertion portion can be changed appropriately. The "insertion portion" in the first to fourth embodiments is exemplified by the insertion portions 173 and 373 configured to be press-fitted in the liquid inlet 113e. The insertion portion is not limited thereto. For instance, the radial size of the insertion portion may be reduced to allow the insertion portion to be placed in contact, but not pressure contact, with the liquid inlet. As another alternative, the insertion portion and the liquid inlet may be designed to be placed close to the liquid inlet with a gap.

In the first to fourth embodiments, the "insertion portion", "annular pressure-contact portion", and "connecting portion" are exemplified respectively by the insertion portions 173 and 373, the annular pressure-contact portions 175, 375, and 475, and the connecting portion 177, each of which is made of EPDM. The material of a rubber elastic element is not limited thereto. For example, styrene-butadiene rubber (SBR), nitrile rubber (NBR), polypropylene (PP), and perfluoro alkoxy fluorine resin (PFA) may be used.

In the first to fourth embodiments, the "groove of connecting portion" is exemplified by the groove 177v which is a U-shaped groove but may be changed in shape and size appropriately. In the third embodiment, the "groove of base portion" is exemplified by the groove 373v which is a U-shaped groove but may be changed in shape and size appropriately.

In the fifth embodiment, a vehicle that mounts the battery(s) 100 according to the invention is exemplified by the hybrid car 700, but it is not limited thereto. Examples of the vehicle that mounts the battery(s) according to the invention include electric cars, plug-in hybrid cars, hybrid railroad vehicles, fork lifts, electric wheelchairs, electric bicycles, and electric scooters.

In the sixth embodiment, the hammer drill 800 is exemplified by the battery-using device that mounts the battery 100 according to the invention, but the invention is not limited thereto. Examples of the battery-using device that mounts the battery according to the invention include various battery-driven household electric appliances, office equipment, and industrial equipment such as personal computers; cellular phones; battery-driven electric tools, permanent power supply systems.

REFERENCE SIGNS LIST 100, 200, 300, 400 Lithium ion secondary battery (Hermetically sealed battery)
110 Battery case
111 Case body member
113 Case lid member
113e Liquid inlet (Through hole)
113h Recessed portion
113j Safety valve
113m Recessed-portion surrounding portion
120 Electrode body
150 Positive electrode terminal
160 Negative electrode terminal
170, 270, 370, 470 Sealing member
171 Covering member (Covering part)
171c Inner surface of Covering part
171d Outer surface of Covering part
171m Circumferential edge portion (of Covering member)
171y Spot weld
173, 373 Insertion portion
373s Distal end portion
373t Contact portion 373k Base portion
373v Groove of Base portion
175, 375, 475 Annular pressure-contact portion
175c, 375c, 475c Surface (of Annular pressure-contact portion)
175c1, 375c1, 475c1 Pressure-contact surface (of Surface)
175c2, 375c2, 475c2 Outer surface (of Surface)
475g Low-contact portion (Part of annular pressure-contact portion in a circumferential direction)
475w1, 475w2, 475w3, 475w4 Recess
177 Connecting portion
177v Groove of Connecting portion
179, 279, 379, 479 Elastic member
700 Hybrid car (Vehicle)
710 Assembled battery
800 Hammer drill (Battery using device)
810 Battery pack

The invention claimed is:

1. A hermetically sealed battery including:
a battery case having a through hole that communicates inside with outside of the battery case;
an electrode body accommodated in the battery case; and
a sealing member that hermetically seals the through hole from outside,
wherein the sealing member includes:
a covering part fixed to the battery case to cover the through hole from outside;
an insertion portion made of a rubber-like elastic body protruding from an inner surface of the covering part, the inner surface being located facing the battery case, and the insertion portion being inserted in the through hole; and
an annular pressure-contact portion made of a rubber-like elastic body protruding from the inner surface of the covering part to surround the insertion portion and being in hermetical pressure-contact from a covering part side with an annular hole-surrounding portion of the battery case located around the through hole under pressure by the covering part, the annular hole-surrounding portion facing the inner surface of the covering part, the annular pressure-contact portion being located between the inner surface of the covering part and the annular hole-surrounding portion facing the inner surface of the covering part,
wherein the sealing member is formed in one of:
a configuration that the insertion portion and the annular pressure-contact portion are spaced from each other;
a configuration that the sealing member includes a connecting portion made of a rubber-like elastic body protruding in annular form from the inner surface of the covering part and being located between and integral with the insertion portion and the annular pressure-contact portion, the connecting portion being formed with an annular groove extending around the insertion portion; and
a configuration that the insertion portion and the annular pressure-contact portion are directly continuous to each other in one piece, a base portion of the insertion portion, the base portion being located closer to the covering part than a contact portion contactable with the through hole is formed with a groove constricted in a radial direction of the base portion.

2. The hermetically sealed battery according to claim 1, wherein the insertion portion is press-fitted in the through hole to hermetically seal the through hole.

3. The hermetically sealed battery according to claim 2, wherein the inside of the battery case is depressurized below atmospheric pressure.

4. The hermetically sealed battery according to claim 1, wherein the covering part includes a circumferential edge portion welded to the battery case by a plurality of spot welds spaced apart from each other.

5. The hermetically sealed battery according to claim 1, wherein outside of the annular pressure-contact portion is communicated with outside of the battery case, and
the annular pressure-contact portion includes a recess partially formed in a circumferential direction to reduce a sealing performance of the annular pressure-contact portion than that of other portions in the circumferential direction.

6. The hermetically sealed battery according to claim 1, wherein the battery case includes a safety valve in a position close to the through hole and the sealing member.

* * * * *